US012391603B2

(12) United States Patent
Chen et al.

(10) Patent No.: US 12,391,603 B2
(45) Date of Patent: Aug. 19, 2025

(54) DENSE GLASS-CERAMIC ARTICLES VIA ADDITIVE MANUFACTURE OF GLASS FRIT

(71) Applicant: CORNING INCORPORATED, Corning, NY (US)

(72) Inventors: Bairu Chen, Shicheng (CN); Marie Jacqueline Monique Comte, Fontenay aux Roses (FR)

(73) Assignee: CORNING INCORPORATED, Corning, NY (US)

( * ) Notice: Subject to any disclaimer, the term of this patent is extended or adjusted under 35 U.S.C. 154(b) by 533 days.

(21) Appl. No.: 17/680,537

(22) Filed: Feb. 25, 2022

(65) Prior Publication Data

US 2022/0274867 A1    Sep. 1, 2022

(51) Int. Cl.
| | |
|---|---|
| *C03B 19/01* | (2006.01) |
| *B33Y 10/00* | (2015.01) |
| *B33Y 40/10* | (2020.01) |
| *B33Y 40/20* | (2020.01) |
| *B33Y 70/00* | (2020.01) |
| *C03B 32/02* | (2006.01) |
| *C03C 1/02* | (2006.01) |
| *C03C 8/02* | (2006.01) |
| *C03C 8/14* | (2006.01) |
| *C03C 10/00* | (2006.01) |

(52) U.S. Cl.
CPC ............... *C03C 8/02* (2013.01); *B33Y 10/00* (2014.12); *B33Y 40/10* (2020.01); *B33Y 40/20* (2020.01); *B33Y 70/00* (2014.12); *C03B 19/01* (2013.01); *C03B 32/02* (2013.01); *C03C 1/026* (2013.01); *C03C 8/14* (2013.01); *C03C 10/00* (2013.01); *C03C 2204/00* (2013.01); *C03C 2205/00* (2013.01)

(58) Field of Classification Search
CPC ..................................................... C03B 19/01
See application file for complete search history.

(56) References Cited

U.S. PATENT DOCUMENTS

| | | |
|---|---|---|
| 4,036,654 A | 7/1977 | Yale et al. |
| 6,430,966 B1 | 8/2002 | Meinhardt et al. |
| 2019/0062218 A1 | 2/2019 | Comte |
| 2019/0070748 A1 | 3/2019 | Comte et al. |

FOREIGN PATENT DOCUMENTS

KR    10-2019-0045024 A    5/2019

OTHER PUBLICATIONS

Hong et al., "Microstructure and properties of CaO—ZrO2—SiO2 glass-ceramics prepared by sintering", In Journal of the European Ceramic Society, vol. 23, Issue 13, 2003, pp. 2193-2202.
Siligardi et al., "Densification of glass powders belonging to the CaO—ZrO2—SiO2 system by microwave heating", In Journal of the European Ceramic Society, vol. 20, 2000, pp. 177-183.

*Primary Examiner* — Cynthia Szewczyk
(74) *Attorney, Agent, or Firm* — Kevin M. Able

(57) ABSTRACT

A method for forming a glass frit for additive manufacturing includes providing a mixture having at least one silicon (Si) compound, at least one calcium (Ca) compound, and at least one zirconium (Zr) compound; melting the mixture at a temperature of at least 1400° C.; cooling the mixture to room temperature to obtain the glass frit including at least 50 wt. % $SiO_2$, at least 30 wt. % CaO, and at least 10 wt. % $ZrO_2$.

7 Claims, 20 Drawing Sheets

DENSE GLASS-CERAMIC ARTICLES VIA ADDITIVE MANUFACTURE OF GLASS FRIT

CROSS-REFERENCE TO RELATED APPLICATIONS

This application claims the benefit of priority under 35 U.S.C. § 119 of Chinese Patent Application Serial No. 202110219317.4 filed on Feb. 26, 2021, the content of which is relied upon and incorporated herein by reference in its entirety.

FIELD

This description pertains to an additive manufacturing process and articles made from an additive manufacturing process. More particularly, this description pertains to additive manufacturing of glass-ceramic objects from glass particles. Most particularly, this description pertains to production of dense, low porosity glass-ceramic objects in an additive manufacturing process.

BACKGROUND

Additive manufacturing uses solid free-form fabrication (SFF) techniques to build or print a physical three-dimensional (3D) object from a computer-aided design (CAD) model of the object. Additive manufacturing is attractive because it can produce objects with complex geometries without complex tooling and with minimal production set-up time. Additive manufacturing works with solid, liquid and powder starting materials. Therefore, in theory, if an object can be formed from a material can be provided in solid, liquid, or powder form, the object can be produced by additive manufacturing.

3D glass-ceramic objects are currently being manufactured by processes such as molding and pressing. These processes require specialized tooling, such as molds, which can make it difficult to produce objects quickly. The more complex the geometry of the object, the longer and more expensive it will take to produce the object by traditional methods such as molding and pressing. For, additive manufacturing is an attractive option for producing complex glass-ceramic objects in short times.

Stereolithography (SLA), selective laser melting or sintering (SLM/SLS), and Three Dimensional Printing (3DP™) are examples of SFF techniques that are used to build 3D glass-ceramic objects. However, additive manufacturing processes using these techniques are currently able to provide high porosity glass-ceramic objects. There is currently a need for an additive manufacturing process capable of producing dense, low porosity glass-ceramic objects.

SUMMARY

A printing material and process for producing dense glass-ceramic articles by additive manufacturing is described. The printing material includes a glass frit that densifies to a degree that closely approximates the theoretical density before appreciable crystallization occurs. Densification without interference from a crystalline phase enables greater degrees of densification. Further heating of the sintered printing material induces crystallization to form glass-ceramic articles having a low residual porosity and a density approaching the theoretical density. The printing material and process enable production of glass-ceramic articles with low residual porosity at modest process temperatures.

The present disclosure extends to:
A process for making glass-ceramic articles comprising:
building a 3D structure from a printing material, said printing material comprising glass frit and a binder composition, said binder composition comprising a curable resin, said building comprising:
  (i) applying a layer of said printing material on a substrate;
  (ii) printing said layer of printing material to form a cross-section of said 3D structure, said printing including curing selected portions of said layer of printing material to form printed regions, said cross-section further including unprinted regions, said unprinted regions comprising uncured portions of said layer of printing material; and
  (iii) repeatedly applying and printing a layer of said printing material to form a plurality of cross-sections of said 3D structure, each of said plurality of cross-sections comprising printed regions and unprinted regions, each of said plurality of cross-sections being formed on a previously formed one of said plurality of cross-sections;
cleaning the 3D structure to remove most of the uncured resin;
debinding said 3D structure, said debinding allows the removal of the cured and the remaining uncured resin from the printed and unprinted regions of the 3D structure to leave pores in the remaining printed 3D structure;
sintering said porous 3D structure to form a sintered 3D structure; and
forming a glass-ceramic article from said sintered 3D structure, said glass-ceramic article having a theoretical density, said glass-ceramic article comprising glass and a crystalline phase, said glass-ceramic article comprising at least 1 wt % of said crystalline phase and having a density of at least 90% of said theoretical density.

The present disclosure extends to:
A printing material for additive manufacturing comprising:
a glass frit, said glass frit having a crystallization temperature and a sintering temperature, said crystallization temperature exceeding said sintering temperature, a difference between said crystallization temperature and said sintering temperature being less than 300° C.; and
a binder composition, said binder composition including a curable resin.

The present disclosure extends to:
A printing material for additive manufacturing comprising:
a glass frit, said glass frit having a glass transition temperature and a crystallization temperature, said crystallization temperature exceeding said glass transition temperature, a difference between said crystallization temperature and said glass transition temperature being greater than 75° C.; and
a binder composition, said binder composition including a curable resin.

In some embodiments, a method for forming a glass frit for additive manufacturing, comprises providing a mixture comprising at least one silicon (Si) compound, at least one calcium (Ca) compound, and at least one zirconium (Zr) compound; melting the mixture at a temperature of at least 1400° C.; cooling the mixture to room temperature to obtain the glass frit comprising: at least 50 wt. % $SiO_2$, at least 30 wt. % CaO, and at least 10 wt. % $ZrO_2$. In one aspect, which is combinable with any of the other aspects or embodiments, the glass frit has a particle size distribution less than 200 μm. In one aspect, which is combinable with any of the other aspects or embodiments, the glass frit has a particle size distribution less than 50 μm.

In some embodiments, a glass frit for additive manufacturing comprises at least 50 wt. % $SiO_2$, at least 30 wt. % CaO, and at least 10 wt. % $ZrO_2$. In one aspect, which is combinable with any of the other aspects or embodiments, the glass frit has a particle size distribution less than 200 μm. In one aspect, which is combinable with any of the other aspects or embodiments, the glass frit has a particle size distribution less than 50 μm. In one aspect, which is combinable with any of the other aspects or embodiments, the glass frit described herein comprises 50-70 wt. % $SiO_2$, 30-50 wt. % CaO, and 10-20 wt. % $ZrO_2$.

In some embodiments, an additive manufacturing process comprises building a 3D structure from a printing material, said printing material comprising a glass frit and a binder composition, said building comprising: (a) applying a layer of said printing material on a substrate; (b) printing said layer of printing material to form a cross-section of said 3D structure, said printing including curing selected portions of said layer of printing material to form printed regions, said cross-section further including unprinted regions, said unprinted regions comprising uncured portions of said layer of printing material; and (c) repeatedly applying and printing a layer of said printing material to form a plurality of cross-sections of said 3D structure, each of said plurality of cross-sections comprising printed regions and unprinted regions, each of said plurality of cross-sections being formed on a previously formed one of said plurality of cross-sections; cleaning the 3D structure to remove most of the uncured resin; debinding the 3D structure to form a porous 3D structure; sintering the porous 3D structure to form a sintered 3D structure; and forming a glass-ceramic article from the sintered 3D structure.

In one aspect, which is combinable with any of the other aspects or embodiments, the binder composition comprises a curable resin. In one aspect, which is combinable with any of the other aspects or embodiments, the step of debinding comprises removing the cured and the remaining uncured resin from the printed and unprinted regions of the 3D structure to form pores in the remaining printed 3D structure. In one aspect, which is combinable with any of the other aspects or embodiments, the glass-ceramic article: has a theoretical density, comprises a glass phase and a crystalline phase, and comprises at least 1 wt. % of the crystalline phase and having a density of at least 90% of the theoretical density. In one aspect, which is combinable with any of the other aspects or embodiments, the crystalline phase comprises a wollastonite main crystalline phase. In one aspect, which is combinable with any of the other aspects or embodiments, the glass-ceramic further comprises a Zr-containing crystalline phase. In one aspect, which is combinable with any of the other aspects or embodiments, the Zr-containing crystalline phase comprises $ZrO_2$ and/or $Ca_2Si_4ZrO_{12}$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
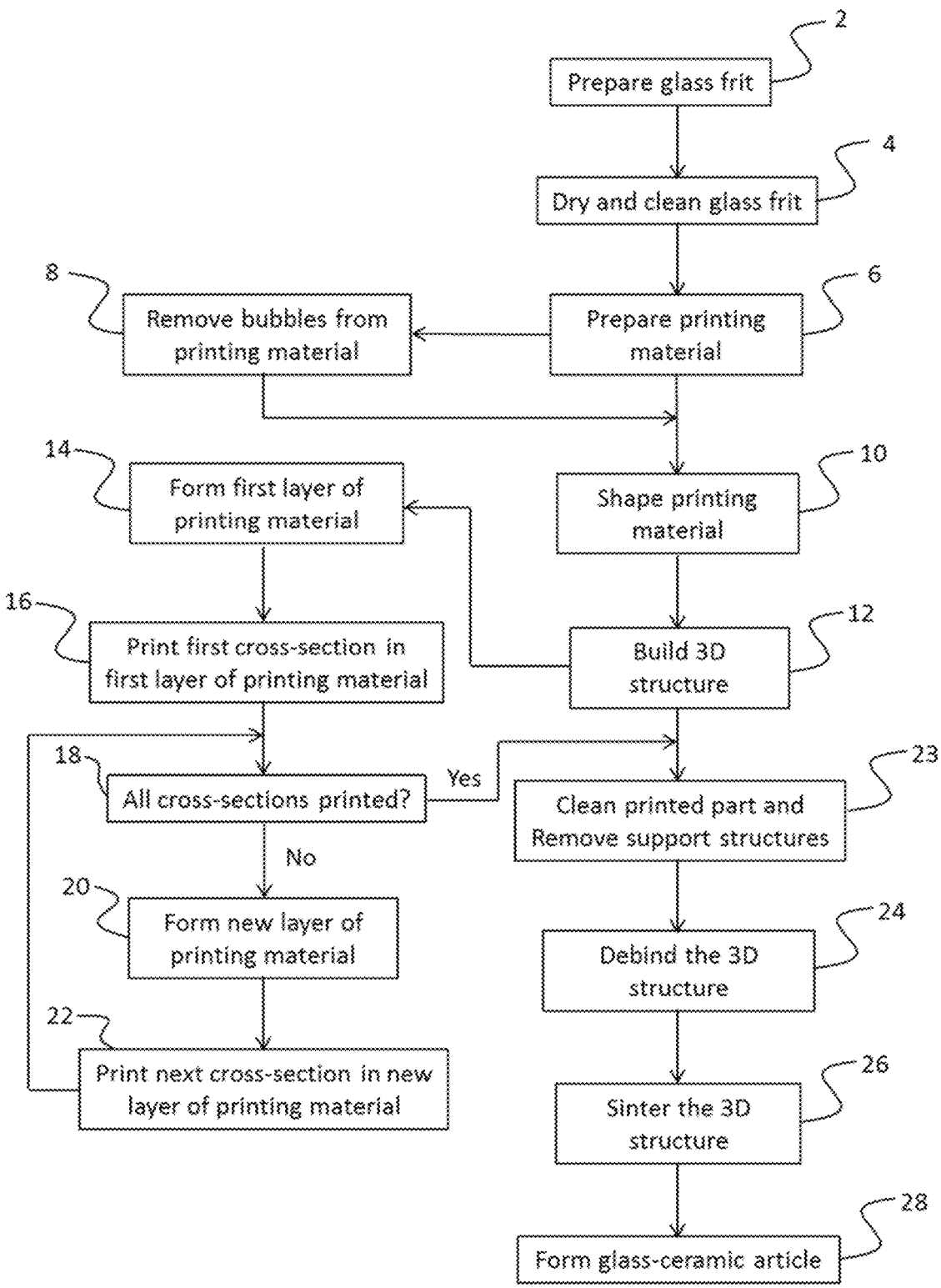
FIG. 1 is a flowchart illustrating an additive manufacturing process for making glass-ceramic articles, according to some embodiments.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Reference will now be made in detail to illustrative embodiments of the present description.

The present disclosure provides an additive manufacturing process for making glass-ceramic articles. The glass-ceramic articles have low porosity and a density that closely approaches the theoretical density of the glass-ceramic article. The glass-ceramic articles are produced from a printing material in an additive manufacturing process. The printing material includes a glass frit and a binder composition. The glass frit consists of glass particles. The binder composition includes a resin. The resin includes one or more compounds that are curable to form an oligomer or polymer that functions as a matrix to bind the glass particles of the glass frit. The resin is thermally curable or photocurable. The binder composition optionally includes a thermal initiator or a photoinitiator to facilitate curing of the resin. The binder composition optionally includes one or more additives.

In the additive manufacturing process, a layer of the printing material is applied to a surface and cured in selected regions. The selected regions are dictated by the design (shape, size etc.) of the intended article of the additive manufacturing process. The selectively-cured layer of printing material corresponds to a cross-section of the article. Portions of the layer of printing material that are cured are referred to herein as printed regions. In the printed regions, the cured resin provides a rigid matrix that binds the glass frit in a relatively immobile state. In the unprinted regions, the resin is in a less rigid uncured state and the glass frit is in a more mobile state. After selectively curing the layer of printing material, a second layer of printing material is applied and selectively cured to provide a second cross-section of the article. The cured regions of the second cross-section are selected according to the design of the article. The process is repeated layer-by-layer to provide a three-dimensional (3D) glass structure that includes printed and unprinted regions. The three-dimensional glass structure is subjected to a debinding process in which unprinted regions are removed to leave pores surrounded by printed regions. After debinding, the porous 3D glass structure is heated to sinter and induce nucleation and growth of one or more crystalline phases in the sintered glass structure to form the intended glass-ceramic article.

FIG. 1 illustrates one embodiment of an additive manufacturing process for making glass-ceramic articles from glass frit. At 2, the glass frit is prepared. Preparation of the glass frit includes obtaining a glass frit having the composition desired for the glass-ceramic article. The glass frit is formed by melting, soot deposition, vapor deposition, spray deposition, sol-gel or other methods known in the art. In the case of melting, after cooling, the glass is milled. In one embodiment, preparation of the glass frit includes controlling the particle size distribution. Particle size distribution can be controlled, for example, by grinding, milling, attrition, sifting and/or filtering the glass frit. The particle size distribution of the powder will be influenced by the minimum feature size of the pattern or shape required in the printed 3D glass-ceramic article. In one embodiment, the maximum particle size of the glass frit is smaller than the minimum feature size that will be printed in the design of the glass-ceramic article. The average particle size (in volume) will typically be in the submicron to micron range; for example in the range from 1 μm-500 μm, or in the range from 1 μm-100 μm, or in the range from 1 μm-25 μm, or in the range from 5 μm-400 μm, or in the range from 5 μm-100 μm, or in the range from 5 μm-25 μm, or in the range from 10 μm-300 μm, or in the range from 10 μm-100 μm, or in the range from 10 μm-25 μm, or in the range from 25 μm-250 μm, or in the range from 5 μm-75 μm, or in the range from 10 μm-60 μm, or greater than 10 μm, or greater than 25 μm, or greater than 50 μm, or greater than 100 μm. If the average article size distribution is fine (e.g., below 10 μm), it is more difficult to obtain a crack-free material after sintering and crystallization.

As noted above, the product of the printing process is a 3D glass structure having printed and unprinted regions. The unprinted regions are removed in a debinding process to form a porous 3D glass structure made from the glass frit. In the heat treatment following printing and debinding, the porous glass structure is sintered and converted to a glass-ceramic article. During sintering, pores of the glass structure close and the glass structure becomes denser. Conversion of the sintered glass structure to a glass-ceramic article includes nucleation and growth of one or more crystalline phases. The composition of the glass frit is selected so that the densification of the glass structure that occurs during sintering is substantially complete before the onset of crystallization.

To achieve dense glass-ceramic objects, it is preferable to increase the density of the glass structure as much as possible before the onset of crystallization. While not wishing to be bound by theory, it is believed that the presence of a crystalline phase inhibits densification and closure of pores during sintering. The viscous nature of glass enables closure of pores and densification during sintering. Crystalline phases are essentially non-viscous and represent physical barriers that inhibit densification. The composition of the glass frit is accordingly selected so that significant densification preferentially occurs during heat treatment before formation of a crystalline phase. Since the reduction in pore volume realized in the sintering process is not significantly affected by subsequent nucleation and growth of a crystalline phase, the present additive manufacturing process enables production of dense glass-ceramic articles.

The densification achieved in the present additive manufacturing process can be described in terms of density of the glass-ceramic article relative to the theoretical density of the glass-ceramic article. The theoretical density of the glass-ceramic article is the density of the glass-ceramic article in a state in which pores are fully closed and the glass-ceramic article is fully densified. Theoretical density is analogously described for glasses and other types of materials. As sintering progresses and pore volume decreases, the density of the glass structure increases. The further the progress of densification during sintering is, the higher is the density of the glass-ceramic article formed after crystallization. Due to limitations on process time in a practical process, the glass structure may not be fully densified at the onset of crystallization and the density of the glass-ceramic article may be less than the theoretical density. Greater densification of the glass structure and higher densities (lower porosities) of glass-ceramic articles formed therefrom, however, are achievable in the present additive manufacturing process than in prior art processes in which crystallization occurs when the glass structure has a high degree of porosity.

The density of glass-ceramic articles formed by the process described herein is at least 90% of the theoretical density, or at least 93% of the theoretical density, or at least 96% of the theoretical density, or at least 99% of the theoretical density.

Returning to FIG. 1, after the glass frit is prepared at 2, it is optionally dried and cleaned at 4. In one embodiment, drying includes vacuum drying. Drying may include, for example, heating the glass frit to a temperature well below the temperature of melting or sintering and removing any vapor produced during the heating by a vacuum system.

A printing material is made from the glass frit at 6. The printing material is in the form of a paste, liquid, slurry, dispersion, or suspension. The printing material is made by combining the glass frit with a binder composition. The binder composition includes a curable resin. Curable resins include one or more monomers or oligomers, each of which has one or more curable functional groups. A monomer, oligomer, or polymer with one curable functional group is referred to as monofunctional, a monomer, oligomer, or polymer with two curable functional groups is referred to as bifunctional, and a monomer, oligomer, or polymer with three or more curable functional groups is referred to as multifunctional. In one embodiment, the curable resin is thermally curable. In another embodiment, the curable resin is photocurable. In one embodiment, the photocurable resin is cured with UV light. In one embodiment, the curable resin includes monomers, oligomers or polymers with one or more ethylenically unsaturated groups per molecule. Ethylenically unsaturated groups are curable functional groups. Ethylenically unsaturated groups include acrylate groups or methacrylate groups. In another embodiment, the curable resin includes monomers, oligomers, or polymers with epoxy functionality. In one embodiment, the resin includes an oligomer selected from epoxy resin oligomers, unsaturated resin polyester resin oligomers, and acrylic resin oligomers. In another embodiment, the resin includes a polyamide, a polyimide, a polyketone, a polyolefin, cellulose or derivatives thereof (e.g. ethylcellulose).

The binder composition preferably includes an initiator to initiate reaction of the curable resin. The curable resin reacts to form oligomers or polymers that bind the glass frit in the printing process. The initiator is a thermal initiator or a photoinitiator. Photoinitiators can be of the radical type or cationic type. Examples of photoinitiators include ketonic photoinitiators, phosphine oxide photoinitiators, 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF (Munich, Germany)); and ethoxy(2,4,6-trimethylbenzoyl)-phenylphosphine oxide (LUCIRIN TPO-L from BASF). Examples of radical photoinitiators are trichloroacetophenones, benzophenone, and benzil dimethyl ketal. Examples of cationic photoinitiators are ferrocenium salt, triarysulfonium salt, and diaryliodonium salt. If the photoinitiator is of the radical type in one embodiment, the curable resin includes epoxy functionality or is an unsaturated polyester or an acrylic compound. If the photoinitiator is of the cationic type in another embodiment, the curable resin is an unsaturated polyester or an acrylic compound.

The binder composition optionally includes one or more additives. The one or more additives may be selected to achieve one or more of control of the viscosity of the printing material, stabilization of the printing material, and prevention of agglomeration of the glass frit. Viscosity control additives include reactive diluents, which are typically low molecular weight monofunctional curable monomers. Stabilizers for the printing material include UV blockers. In one embodiment, the binder composition includes a natural or synthetic wax additive to facilitate formation of a printing material in the form of a paste. Examples of waxes include paraffin, beeswax, carnauba, and polyethylene wax. Additives may also include organic solvents, dispersants, surfactants and the like, particularly in embodiments in which the printing material is in the form of a slurry, liquid or suspension.

A representative commercial binder composition is PR48 (available from Colorado Photopolymer Solutions (Boulder, CO)). PR48 includes curable oligomers (39.8 wt % Allnex Ebecryl 8210, 39.8 wt % Sartomer SR494), a reactive diluent (19.9 wt % Rahn Genomer 1122), a UV blocker (0.16 wt % Mayzo OB+), and a photoinitiator (0.4 wt % Esstech TPO+).

In one embodiment, the process includes removing bubbles trapped inside the printing material under vacuum (8). The vacuum pressure under which the bubbles are removed from the printing material is a design variable that depends on the composition of the printing material. In one embodiment, the vacuum pressure is in a range from 1 mbar to 10 mbar. In another embodiment, processing of the printing material under vacuum includes vacuum degassing of the printing material. The mixing of the glass frit and binder composition to form the printing material and the removal of bubbles trapped inside the printing material may be carried out in a mixing system that is capable of vacuum and re-pressurization sequences. Mixing of the glass frit and binder composition to form the printing material and the vacuum processing of the printing material to remove trapped bubbles may be carried out simultaneously, or vacuum processing of the printing material may be carried out after initial mixing.

In some embodiments, the glass frit and binder composition are heated during the mixing. The temperature of heating, for example, is up to a temperature of about 100° C. The heating may decrease the viscosity of the binder composition in order to promote uniform mixing of the glass frit with the binder composition. Such heating is optional and may not be needed if the binder composition is fluid at room temperature. Any vapor produced during the heating may be removed by vacuum degassing or other suitable method.

The ratio in weight between the glass frit, curable resin, initiator, and additive(s) in the printing material is selected such that there will be enough binder (cured resin) to enable contact between particles of the glass frit and sufficient open porosity to enable full removal of the binder during thermal cycles before final sintering of the particles of the glass frit. The proportion of glass frit in the printing material is greater than 30 wt %, or greater than 40 wt %, or greater than 50 wt %, or greater than 60 wt %, or greater than 70 wt %, or in the range from 30 wt %-80 wt %, or in the range from 40 wt %-75 wt %, or in the range from 50 wt %-70 wt %. The balance of the printing material is the binder composition. The proportion of curable resin in the binder composition is in the range from 50 wt %-95 wt %, or in the range from 55 wt %-90 wt %, or in the range from 60 wt %-85 wt %, or in the range from 65 wt %-80 wt %. The proportion of initiator in the binder composition in the range from 0.1 wt %-5.0 wt %, or in the range from 0.2 wt %-4.0 wt %, or in the range from 0.3 wt %-3.0 wt %. The proportion of additive(s) in the binder composition is in the range from 1.0 wt %-40 wt %, or in the range from 2.0 wt %-30 wt %, or in the range from 3.0 wt %-25 wt %, or in the range from 5.0 wt %-20 wt %.

The printing material is optionally shaped at 10 into a form suitable for dispensing and forming a layer of printing material during printing of the 3D structure. When the printing material is in the form of a paste, for example, it may be shaped as a rod or pellet to facilitate dispensation and application to a surface. Shaping may be carried out under vacuum to avoid trapping new bubbles in the printing material.

The process continues with building a 3D structure from the printing material at 12. The 3D structure is based on the design of the glass-ceramic article that is to be produced by the process. The 3D structure is built using a solid free-form fabrication (SFF) technique. Before building the 3D structure, a model of the 3D article is built using CAD software (such as PRO-ENGINEER or I-DEAS). The CAD software will typically output a .stl file, which is a file containing a tessellated model of the 3D article. A tessellated model is an array of triangles representing the surfaces of the CAD model. The .stl file contains the coordinates of the vertices of these triangles and indices indicating the normal of each triangle. The tessellated model is sliced into layers (cross-sections) using slicing software (such as MAESTRO from 3D Systems). The slicing software outputs a build file containing information about each slice or layer of the tessellated model. The information about each slice or layer contains the necessary geometric data to build a cross-section of the article. The build file is then sent to a SFF system to build a 3D structure that is ultimately further processed to form the intended article. Newer generation CAD software may be able to output a build file directly from the CAD model, eliminating the need for separate slicing software, or may be able to "print" the build data directly to a suitable SFF system.

In one embodiment, the 3D structure is built using a modified stereolithography technique described at 14, 16, 18, 20, and 22 in FIG. 1. With the technique, the 3D structure is built layer-by-layer on a build platform or substrate. At 14, a first layer of printing material is applied, deposited, or otherwise formed on a build platform or substrate. The thickness of the layer of printing material is typically in the submicron to micron range, e.g., few nanometers up to 200 μm. At 16, the first layer of printing material is printed. In the printing process, the layer of printing material is selectively cured to form printed regions. Curing is induced by applying a thermal or optical source to selected spatial portions of the layer of printing material to effect thermal or photocuring of the curable resin contained in the layer of printing material. Curing of the curable resin induces a reaction, such as a polymerization or oligomerization reaction, that increases the rigidity of the curable resin in the printed region. In one embodiment, curing solidifies the curable resin. The uncured resin in the unprinted regions is fluid. A sharp contrast in rigidity of the resin in the printed and unprinted regions results. The pattern of printed regions in the layer of printing material corresponds to a cross-section of the 3D structure. The information contained in the build file for the corresponding layer of the 3D structure is used to determine the select areas of the layer of printing material that get printed to define a cross-section. At 18, a determination is made as to whether the 3D structure is complete or whether additional layers of printing material are needed to form additional cross-sections of the 3D structure. If the 3D structure is incomplete, the process moves to 20 and a new layer of printing material is applied on top of the previous printed layer. The new layer is printed at 22 according to information contained in the build file to form the next cross-section of the 3D structure. Steps 18, 20, and 22 are repeated until the full 3D structure is printed.

At 23, the printed part is cleaned and support structure are removed. When the 3D structure is complete, it is removed from contact with the binder composition. Any excess uncured resin on the surface of the 3D structure is then optionally removed. Removal of uncured resin occurs in a cleaning step in which the 3D structure is washed with a solvent (e.g. an alcohol such as isopropyl alcohol) for several minutes to dissolve or drain excess uncured resin. The washing process may also remove a portion of the uncured resin in the unprinted regions of the 3D structure, and then support structures can be removed The process continues to 24 for debinding of the 3D structure. During the debinding, cured and uncured resin is removed from the printed and unprinted regions of the 3D structure to leave pores in the remaining printed 3D structure. Debinding includes heating the 3D structure in air at a controlled rate to a temperature insufficient to sinter the 3D structure. Debinding leads to combustion, decomposition, and/or volatilization of the resin remaining in the 3D. The glass portion of the 3D structure remains. A typical heating schedule for debinding is to heat at a rate of ~5° C./min up to 90° C. and at a rate of ~2° C./min up to an upper temperature of about 100° C. or more below the temperature needed to induce sintering of the glass composition of the 3D structure. The 3D structure can be held at the upper temperature for a specified dwell time (typically a few minutes to a few hours) and then cooled to room temperature at a rate of ~5° C./min. The porous 3D structure may be air cleaned after debinding to remove any remaining debris or loose matter from the structure.

After debinding, the porous 3D structure is subjected to sintering at 26. Sintering is a heat treatment process that causes closing of pores and densification of the porous 3D structure to form a sintered 3D structure. Sintering occurs at a higher temperature than debinding. In one embodiment, debinding and sintering are completed in a continuous thermal cycle. Debinding and/or sintering may be carried out under vacuum, which may include selective vacuum degassing to avoid or remove bubbles trapped in the porous 3D structure as pores collapse during formation of the sintered 3D structure to ensure more complete densification. Typical vacuum pressures are in the range of 1 mbar to 10 mbar. Sintering is optionally conducted in a helium atmosphere, where the helium will remove gas trapped as bubbles in the porous 3D structure. Sintering is also optionally conducted in a chlorine atmosphere, where chlorine removes residual hydroxides in the porous 3D structure.

Both debinding and sintering are heat treatment processes carried out in suitable furnaces. In one embodiment, the ramp and dwell times of the debinding and sintering processes are defined on the basis of differential thermal analysis, a technique that indicates the heat of the reaction and the weight variation during a thermal cycle. In general, debinding should be done with very slow thermal ramps, e.g., 1 to 2° C./min to heat the 3D structure as uniformly as possible so that all the surfaces of the 3D structure have sufficient heating time to ensure complete removal of the binder. The heating ramp rate and dwell time are preferably controlled to ensure evaporation of the binder in the interior of the 3D structure before sintering of the particles of glass frit in the 3D structure commences.

The sintered 3D structure is further heat treated at 28 to induce crystallization and conversion of the sintered 3D structure to a glass-ceramic article. Crystallization includes nucleation and growth of crystalline phases. The proportion of crystalline phases depend on the degree of crystallization and is controlled by the time and temperature of the crystallization process.

The time and temperature of sintering and crystallization depend on the composition of the glass frit. As noted above, in order to achieve a high density glass-ceramic article, it is preferable that densification is as complete as possible before appreciable crystallization occurs. In a preferred embodiment, densification occurs substantially during sintering and crystallization occurs substantially after densification is complete. In one embodiment, the thermal treatment cycle is controlled (e.g. by adjusting time and/or temperature following sintering) to induce crystallization following sintering without cooling the sintered 3D structure. In another embodiment, the sintered 3D structure is cooled (e.g. to room temperature) and reheated to induce crystallization.

In one embodiment, the sintered 3D structure comprises at least 90 wt % glass having the composition of the glass frit and has a density of at least 90% of the theoretical density of the composition of the glass frit. In another embodiment, the sintered 3D structure comprises at least 95 wt % glass having the composition of the glass frit and has a density of at least 90% of the theoretical density of the composition of the glass frit. In still another embodiment, the sintered 3D structure comprises at least 98 wt % glass having the composition of the glass frit and has a density of at least 90% of the theoretical density of the composition of the glass frit.

In one embodiment, the sintered 3D structure comprises at least 90 wt % glass having the composition of the glass frit and has a density of at least 95% of the theoretical density of the composition of the glass frit. In another embodiment, the sintered 3D structure comprises at least 95 wt % glass having the composition of the glass frit and has a density of at least 95% of the theoretical density of the composition of the glass frit. In still another embodiment, the sintered 3D structure comprises at least 98 wt % glass having the composition of the glass frit and has a density of at least 95% of the theoretical density of the composition of the glass frit.

In one embodiment, the sintered 3D structure comprises at least 90 wt % glass having the composition of the glass frit and has a density of at least 98% of the theoretical density of the composition of the glass frit. In another embodiment, the sintered 3D structure comprises at least 95 wt % glass having the composition of the glass frit and has a density of at least 98% of the theoretical density of the composition of the glass frit. In still another embodiment, the sintered 3D structure comprises at least 98 wt % glass having the composition of the glass frit and has a density of at least 98% of the theoretical density of the composition of the glass frit.

In one embodiment, the sintered 3D structure comprises glass having the composition of the glass frit and a crystalline phase, where the sintered 3D structure has a crystalline phase content less than 1 wt % and a density of at least 90% of the theoretical density of the composition of the glass frit. In one embodiment, the sintered 3D structure comprises glass having the composition of the glass frit and a crystalline phase, where the sintered 3D structure has a crystalline phase content less than 1 wt % and a density of at least 95% of the theoretical density of the composition of the glass frit. In one embodiment, the sintered 3D structure comprises glass having the composition of the glass frit and a crystalline phase, where the sintered 3D structure has a crystalline phase content less than 1 wt % and a density of at least 98% of the theoretical density of the composition of the glass frit.

In one embodiment, the sintered 3D structure comprises glass having the composition of the glass frit and a crystalline phase, where the sintered 3D structure has a crystalline phase content less than 0.5 wt % and a density of at least 90% of the theoretical density of the composition of the glass frit. In one embodiment, the sintered 3D structure comprises glass having the composition of the glass frit and a crystalline phase, where the sintered 3D structure has a crystalline phase content less than 0.5 wt % and a density of at least 95% of the theoretical density of the composition of the glass frit. In one embodiment, the sintered 3D structure comprises glass having the composition of the glass frit and a crystalline phase, where the sintered 3D structure has a crystalline phase content less than 0.5 wt % and a density of at least 98% of the theoretical density of the composition of the glass frit.

The sintered 3D structure is further heat treated to induce crystallization to form a glass-ceramic article. Crystallization leads to formation of one or more crystalline phases, where each crystalline phase corresponds to a distinct crystalline composition or a polymorph of a distinct crystalline composition. The crystalline composition is the same as or different from the composition of the glass frit.

Figure 2A:
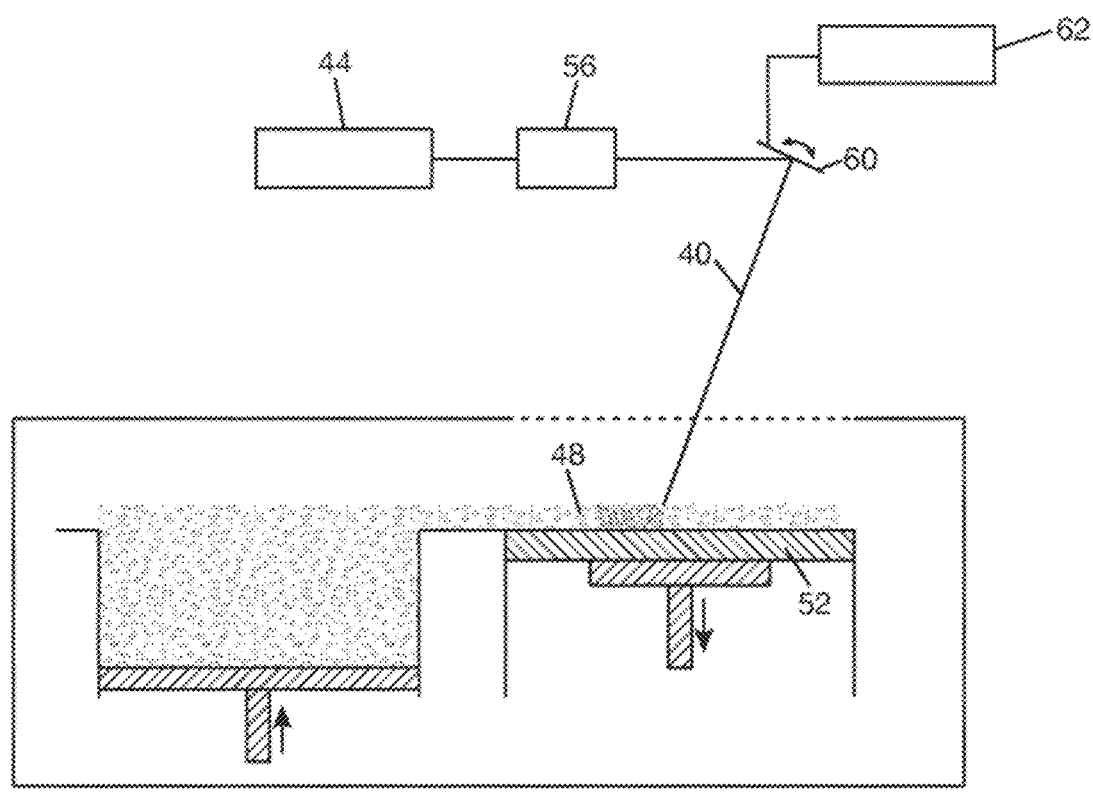
FIGS. 2A-2C illustrate a method of building a 3D structure using a printing material, according to some embodiments.
Figure 2B:
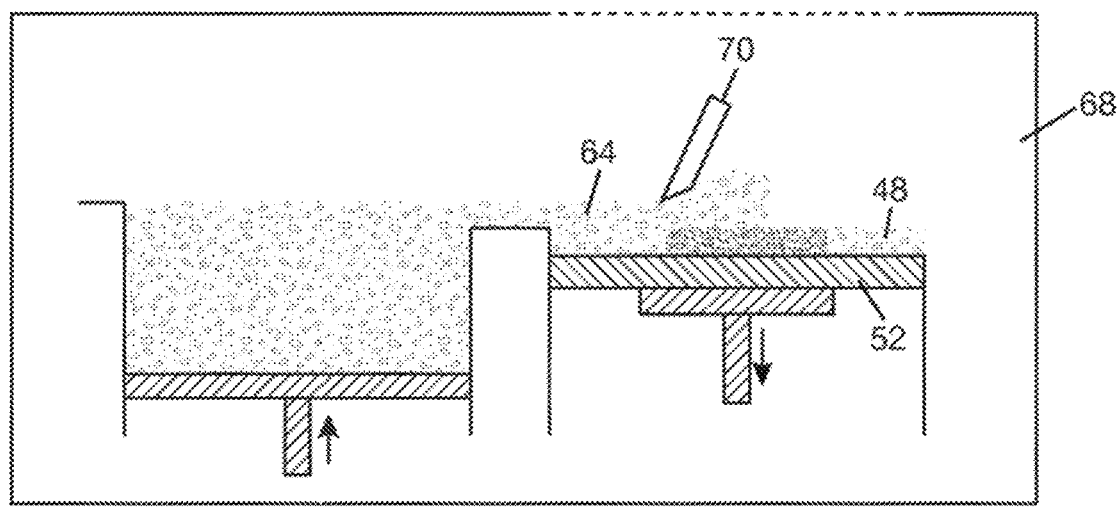
Figure 2C:
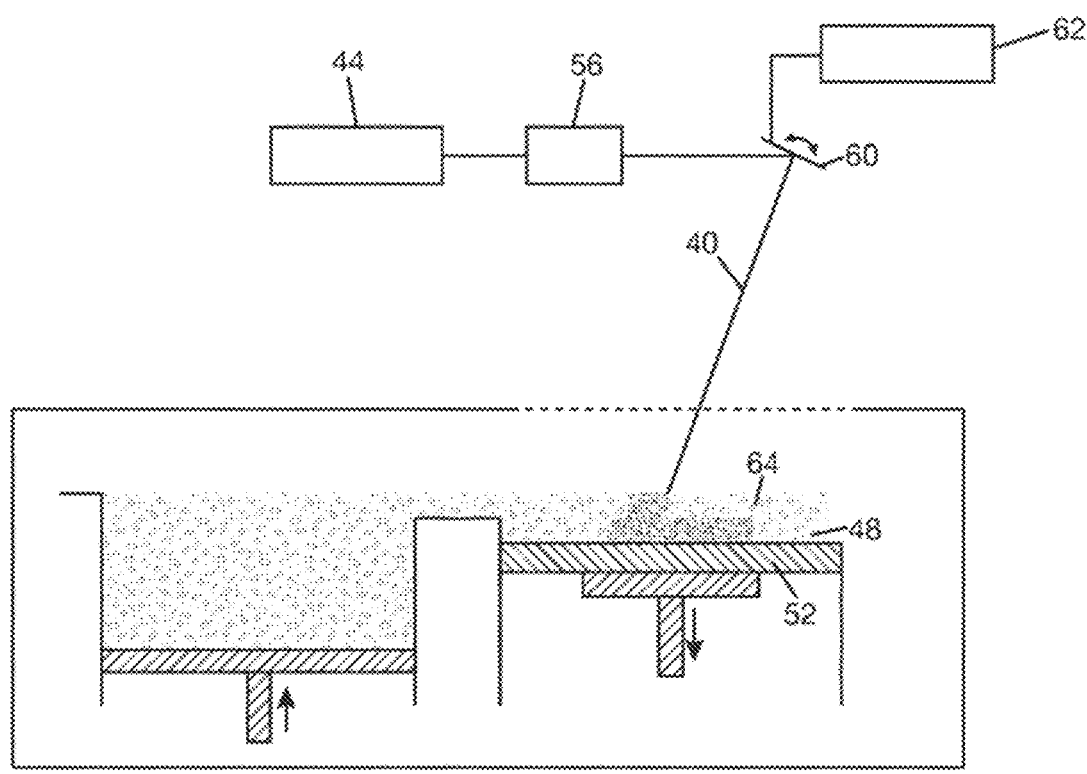

FIGS. 2A-2C illustrate one method for carrying out steps 14-22 of FIG. 1. In this method, the printing material is provided as a paste. FIG. 2A shows a laser beam 40, from a laser source 44, focused onto a layer of printing material (printing material layer) 48 on a build platform 52 using, for example, a scanning mirror 60. (Although only mirror 60 is shown for illustration purposes, it is also possible to use two mirrors, one of the X-axis, and the other for the Y-axis to direct laser beam 40.) The laser beam 40 may pass through a beam shaper 56 prior to being focused onto the printing material layer by the scanning mirror 60. The laser beam 40 has a wavelength selected to induce photocuring of layer of printing material 48. Depending on the composition of the layer of printing material 48, the wavelength of laser beam 40 is an ultraviolet wavelength, a visible wavelength, or an infrared wavelength. The laser source 44 preferably operates at a wavelength at which the glass frit in the layer of printing material is not absorbing. In one embodiment, the laser source 44 operates at a wavelength in the 350 to 430 nm range. The laser beam 40 scans the surface of the printing material layer 48 according to the information contained in the build file for that layer. The build file may be provided to a controller 62, which may operate the scanning mirror 60 in order to position the laser beam 40 at desired locations on the printing material layer 48. In areas of the printing material layer 48 exposed to the laser beam 40, the radiation activates the photoinitiator in the layer of printing material 48, which initiates a chemical reaction that polymerizes and hardens the curable resin in the printing material layer to form printed regions.

Figure 3A:
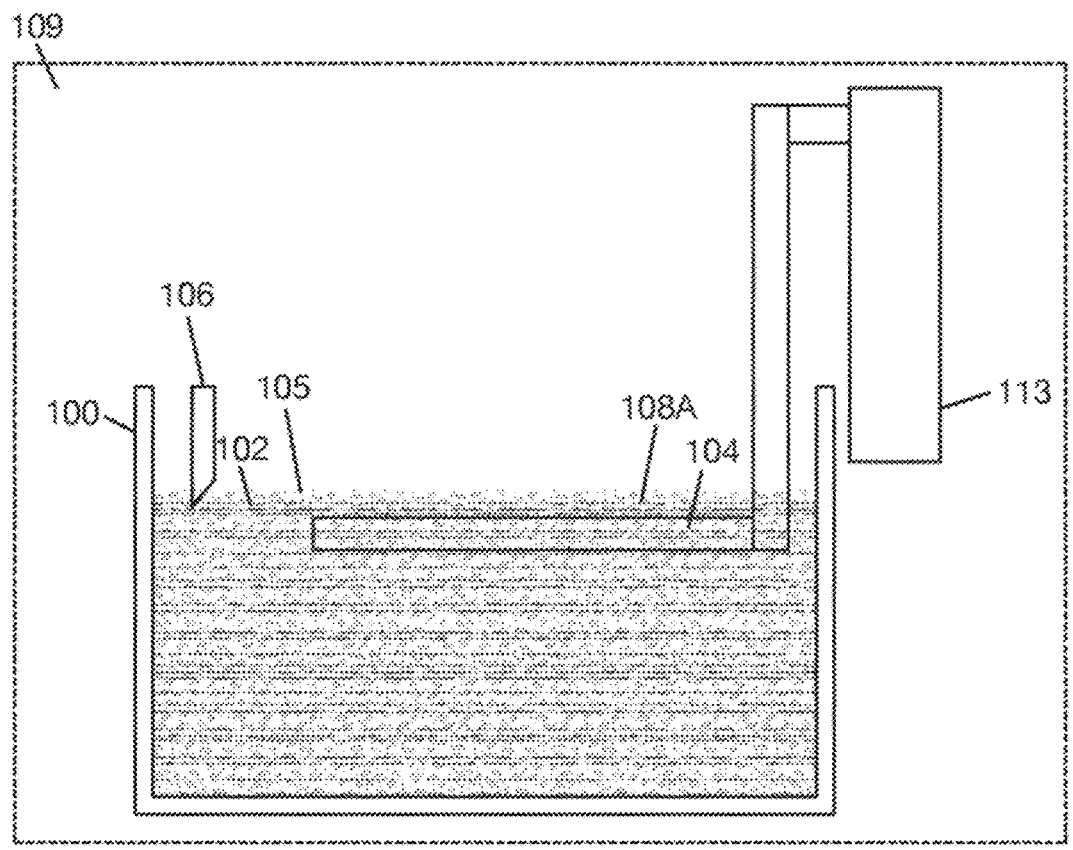
FIGS. 3A-3D illustrate a method of building a 3D structure using a printing material, according to some embodiments.
Figure 3B:
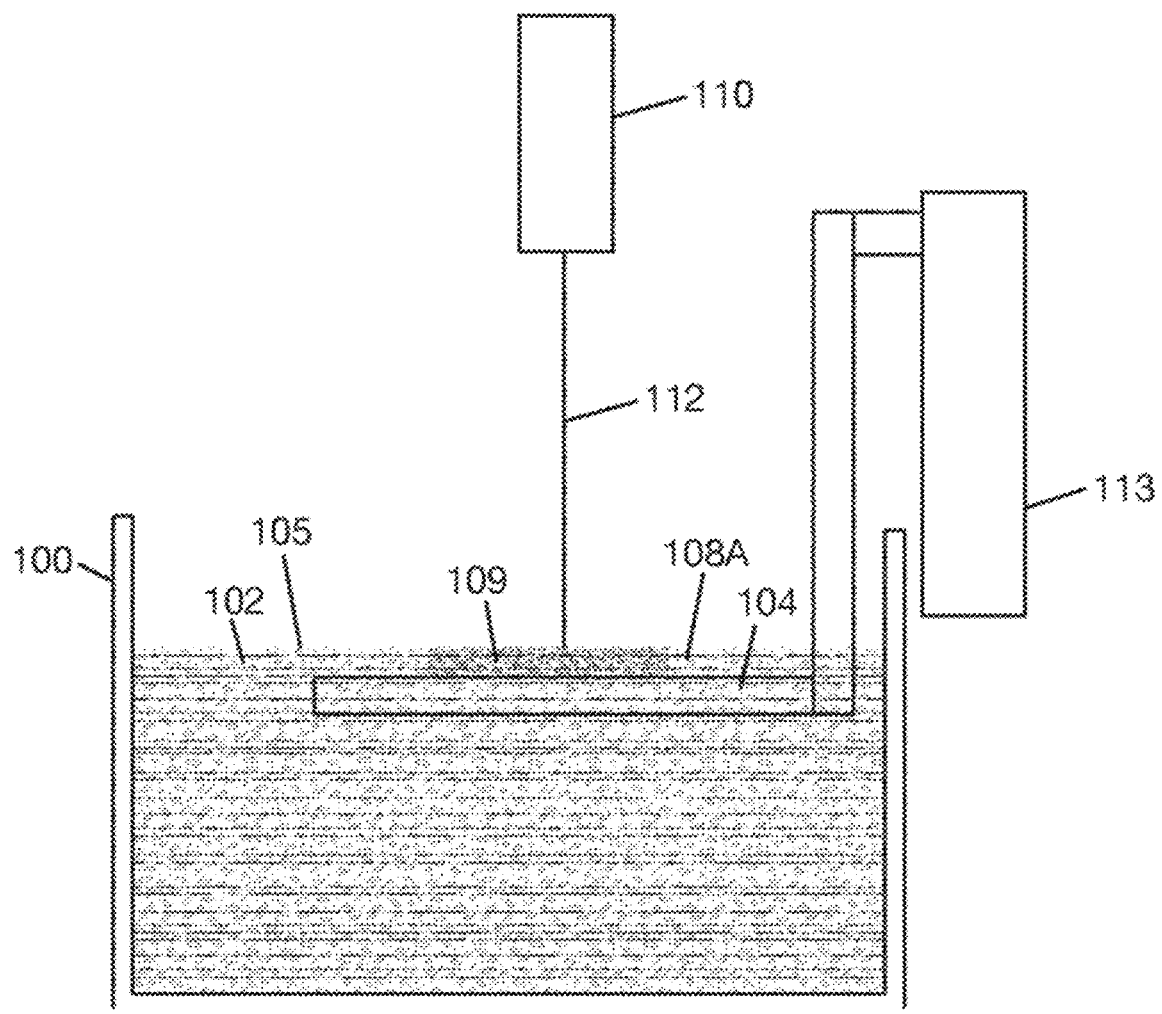
Figure 3C:
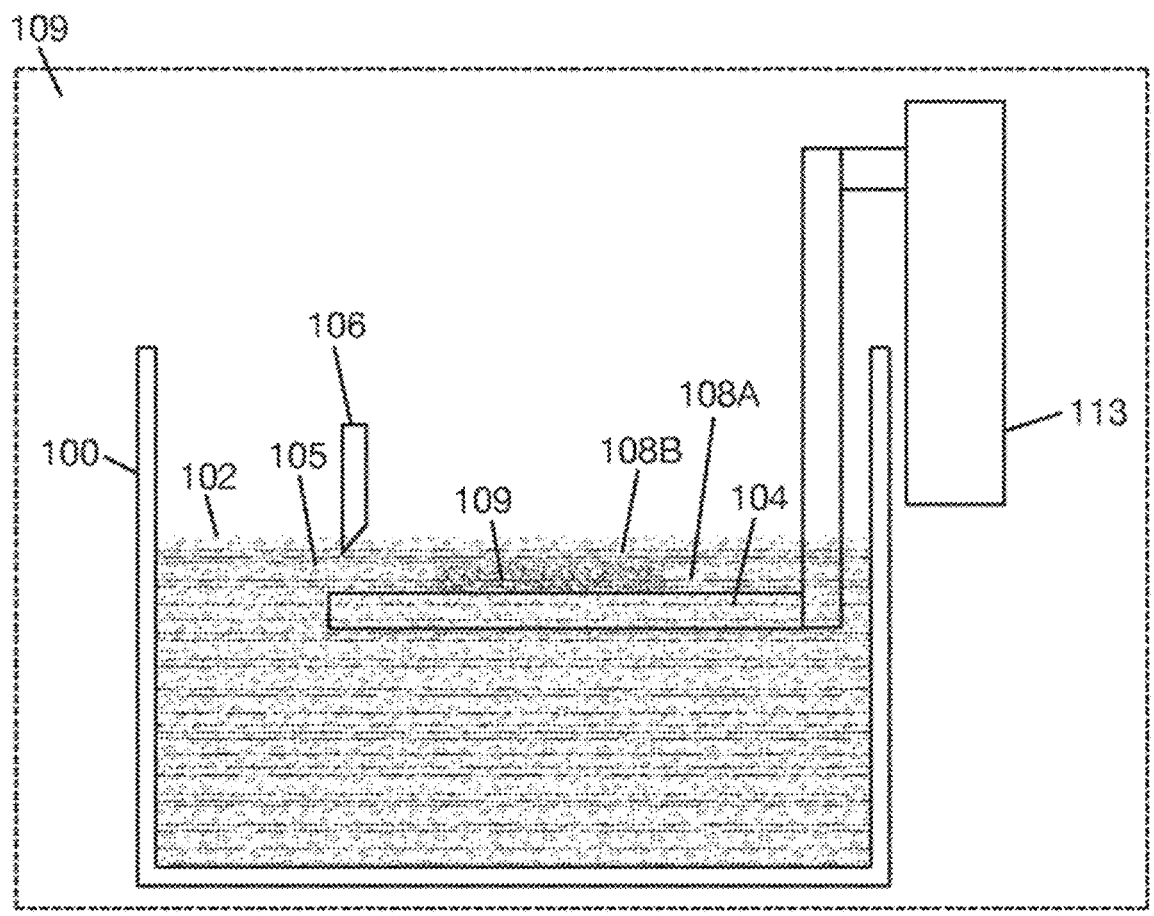

After the first cross-section of the 3D structure has been formed in the first printing material layer 48, a second printing material layer 64 is applied, deposited, or otherwise formed on the first printing material layer 48, as shown in FIG. 3B. A doctor blade 70 may be used to apply or spread printing material layer 64. As shown in FIG. 3C, the printing process is repeated for the next cross-section of the 3D part. During the printing process, the curable resin in the second printing material layer 64 is cured and also bonds to the cured resin in the underlying first printing material layer 48. The process of laying down a new printing material layer and forming a cross-section of the 3D structure in the new layer is repeated layer-by-layer until building of the 3D structure is complete. As shown in FIG. 3B, spreading, or depositing, of the printing material layers may be carried out in a vacuum chamber 68 to maintain the printing material layers essentially free of trapped bubbles. Although, as described above, it may be possible to maintain the printing material layers essentially free of trapped bubbles while spreading, or depositing, the printing material layers without use of vacuum.

FIG. 3A illustrates another method for building a 3D structure using stereolithography. In this method, the printing material is provided as a slurry or liquid suspension. FIG. 3A shows a vat 100 containing the printing material 102. A build platform 104 is located within the vat 100 and positioned below the surface 105 of the printing material such that a layer of the printing material 108A is formed on the build platform 104. A doctor blade 106 may be used to spread the printing material layer 108A uniformly on the build platform 104. The spreading of the printing material layer may be carried out in a vacuum chamber 109 to maintain the printing material layer 108A essentially free of trapped bubbles. Vacuum degassing may be used during the spreading of the printing material layer to remove bubbles. In alternate embodiments, it may not be necessary to spread the printing material layer under vacuum, or to use vacuum degassing, and the action of the doctor blade 106 may provide the desired avoidance of trapped bubbles in the printing material layer 108A.

As shown in FIG. 3B, after the spreading of the printing material layer 108A is completed, an XY-scanning laser 110 then prints a first cross-section of the 3D structure on the printing material layer 108A. "Printing" consists of scanning the printing material layer 108A with a laser beam 112 according to the information contained in the build file for that layer. As in the previous example of FIGS. 2A-2C, in areas of the printing material layer 108A exposed to the laser beam 112, the radiation activates the photoinitiator in the printing material, which initiates a chemical reaction that polymerizes and hardens the curable resin in the printing material, thereby forming a printed region 109 in the printing material layer 108A corresponding to the first cross-section of the 3D structure.

Figure 3D:
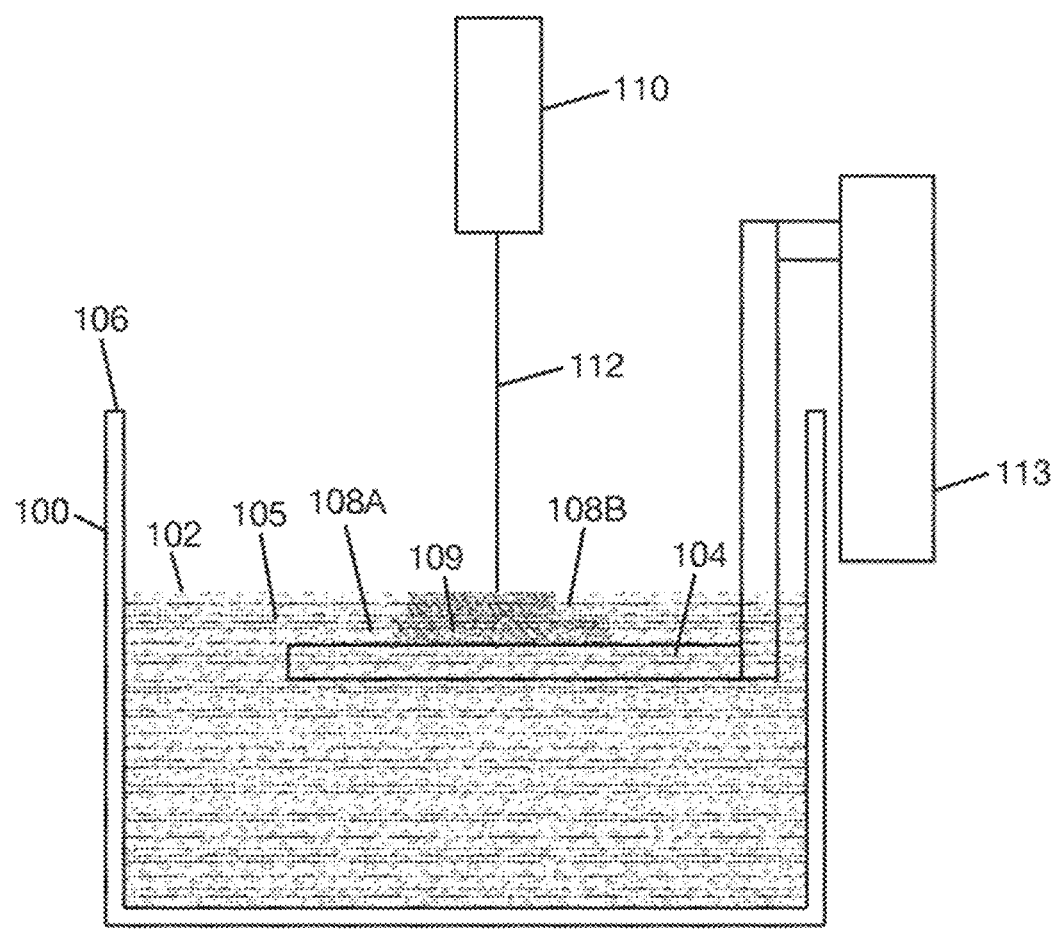

After the first cross-section of the 3D structure has been formed in the printing material layer 108A, the build platform 104 (and the printed region 109 formed thereon) is lowered within the vat 100, as shown in FIG. 3C, such that a new printing material layer 108B is formed on the first printing material layer 108A. Any suitable actuator 113 may be used to lower the build platform 104. The doctor blade 106 is again used to spread the new printing material layer 108B uniformly over the underlying printing material layer 108A. In one embodiment, lowering of the build platform 104 and spreading of the new printing material layer 108B are carried out under vacuum to avoid trapping of bubbles in the new printing material layer 108B. As shown in FIG. 3D, the next cross-section of the 3D structure is printed on the new printing material layer 108B. The hardened resin in the new printing material layer 108B will be linked with the structure 109 in the underlying printing material layer 108A. The process of spreading a new printing material layer while avoiding trapping of bubbles in the layer and printing a new cross-section of the 3D part in the new printing layer is repeated until all the cross-sections of the 3D structure have been printed.

Figure 4A:
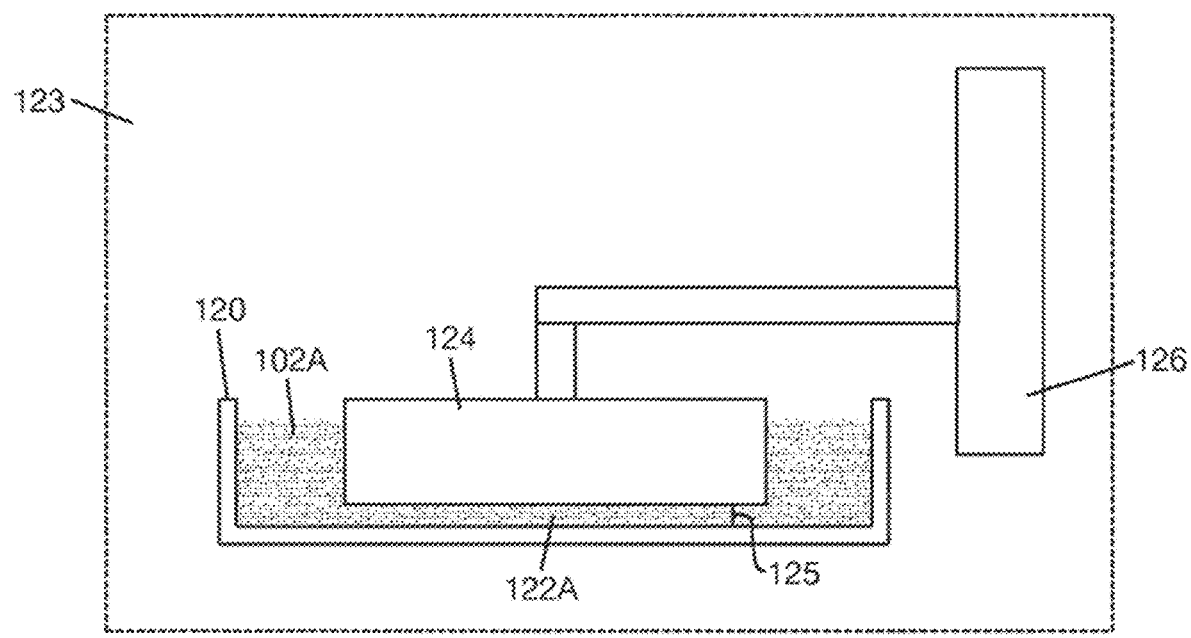
FIGS. 4A-4D illustrate a method of building a 3D structure using a printing material, according to some embodiments.

FIG. 4A illustrates another method for carrying out steps 14-22 of FIG. 1. In this method, the printing material is provided as a slurry or liquid suspension. FIG. 4A shows an amount of the printing material 102A poured into a vat 120. An actuator 126 is used to position a build platform 124 a distance from the bottom of the vat 120. The gap 125 between the bottom of the vat 120 and the bottom of the build platform 124 determines the thickness of a first layer of printing material 122A. The pouring of the printing material 102A into the vat 120 and the positioning of the build platform 124 inside the vat 120 to form the first layer of printing material 122A may be carried out in a vacuum environment 123 to avoid trapping bubbles in the first layer of printing material 122A. If needed, vacuum degassing may be used to further ensure that the printing material layer 122A is essentially free of trapped bubbles.

Figure 4B:
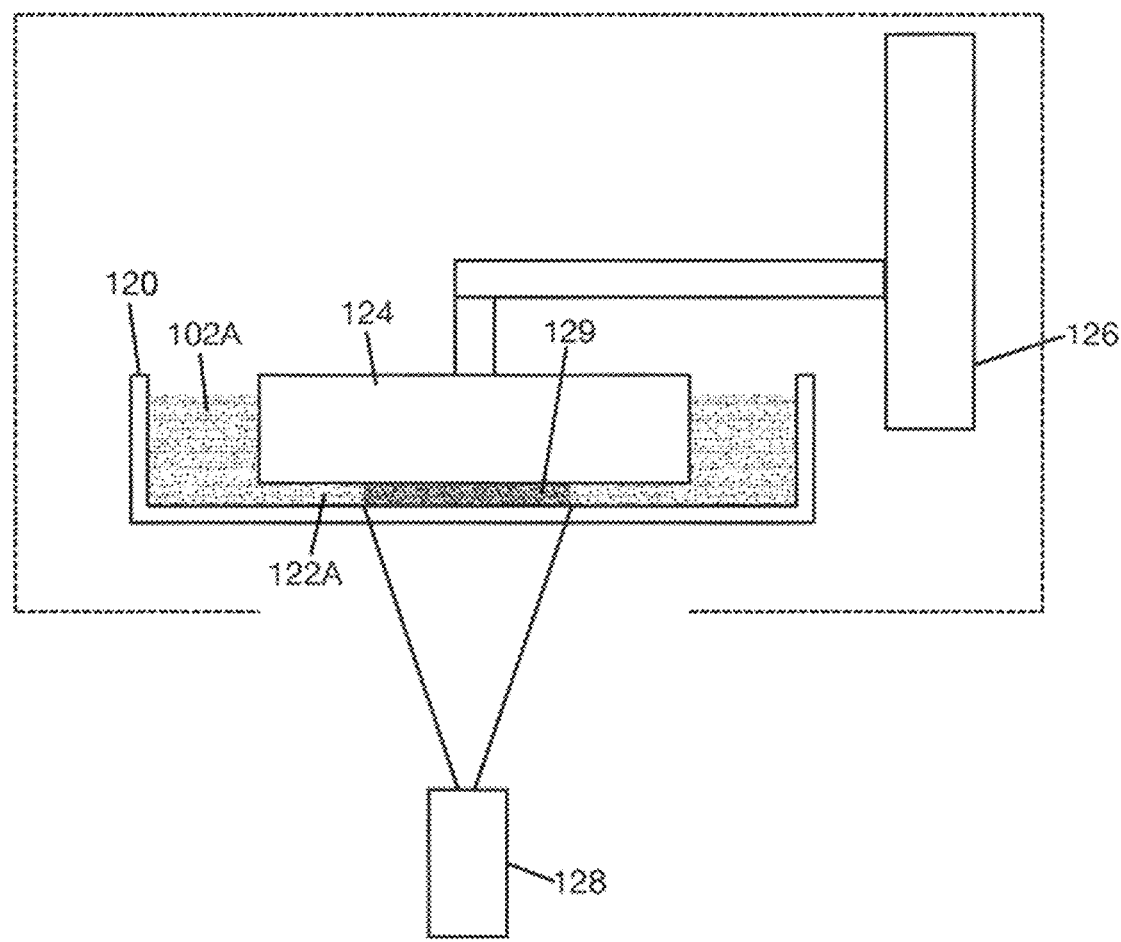

Below the vat 120, as shown in FIG. 4B, is a UV Digital Light Processing (DLP) projector 128, which exposes the printing material layer 122A using a continuous layer mask (2D image). The UV DLP projector 128 is used to print a cross-section of the 3D structure in the printing material layer 122A. (It should be noted that a UV laser may be used instead of a UV DLP for printing of the cross-section of the 3D structure in the printing material layer 122A.) For the setup shown in FIG. 4B, the vat 120, at least in the bottom section, will need to be made of a suitable material to allow the light beams from the UV DLP projector 128 to pass through to the printing material layer 122A. In one embodiment, the UV DLP projector 28 operates in the 350 nm to 430 nm range. The printed region 129 built in the printing material layer 122A by selective exposure to radiation will adhere to the building platform 124. This may be accomplished by providing a suitable bottom surface of the building platform 124 for the printed region 129 to adhere to.

Figure 4C:
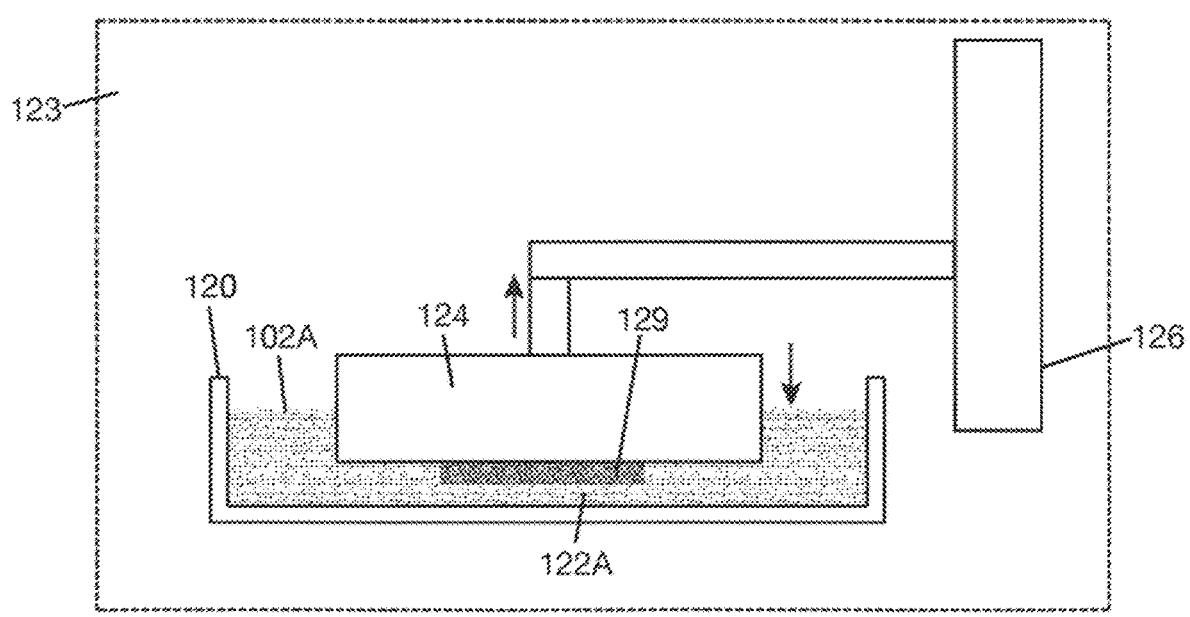
Figure 4D:
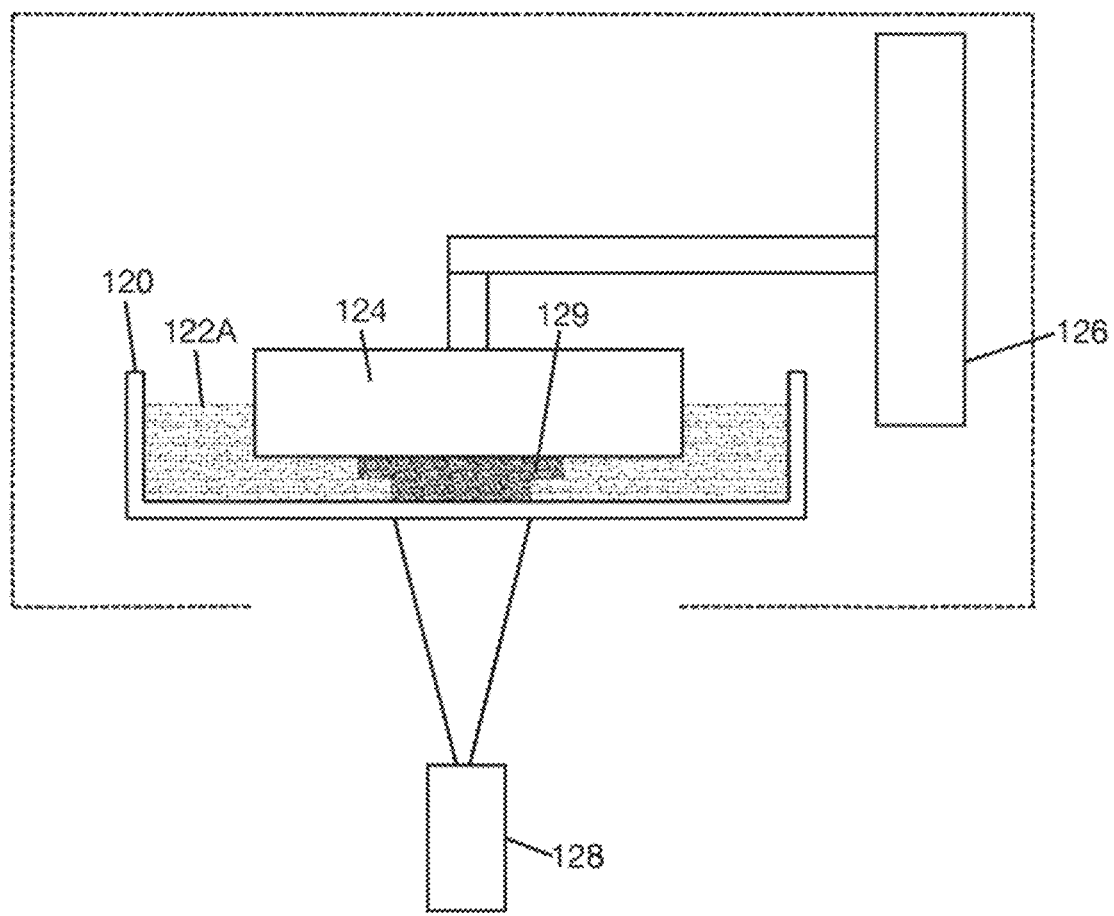

After the printing of a cross-section of the 3D structure in the first printing material layer 122A is complete, the building platform 124 and the printed region 129 will be raised by a height equal to the height of the next printing material layer 122B, as shown in FIG. 4C. The printing material 102A in the vat 120 will flow to fill the void created by raising the building platform 124 and printed region 129 to form the next printing material layer 122C. The raising of the building platform 124 may be carried out in the vacuum environment 123 to avoid introduction, or trapping, of bubbles in the next printing material layer 122B due to movement of the printing material 102A within the vat 120. If needed, vacuum degassing may be used to further ensure that the next printing material layer 122B is essentially free of trapped bubbles. In FIG. 4D, the DLP projector 128 is then used to print the next cross-section of the 3D structure in the new printing material layer 122B. This process (FIGS. 4C and 4D) is repeated until all the cross-sections of the 3D part have been sequentially printed in printing material layers.

For all the methods described above, and variations thereof, steps in which motion can be imparted to the printing material, such as when spreading a new printing material layer on a previous printing layer or on a build platform, may be performed in a vacuum environment, which may involve vacuum degassing as needed, so as to avoid trapping of bubbles in the printing material layers. Vacuum degassing sequences may be used while in the vacuum environment. Also, it may be possible to avoid trapping of bubbles in the printing material layers without use of vacuum. For example, the possibility of using a doctor blade to smooth out bubbles in a printing layer has been described above. In addition, any means of printing a 2D image on a printing material layer, including those already described above, may be used in any of the methods described above.

Figure 5A:
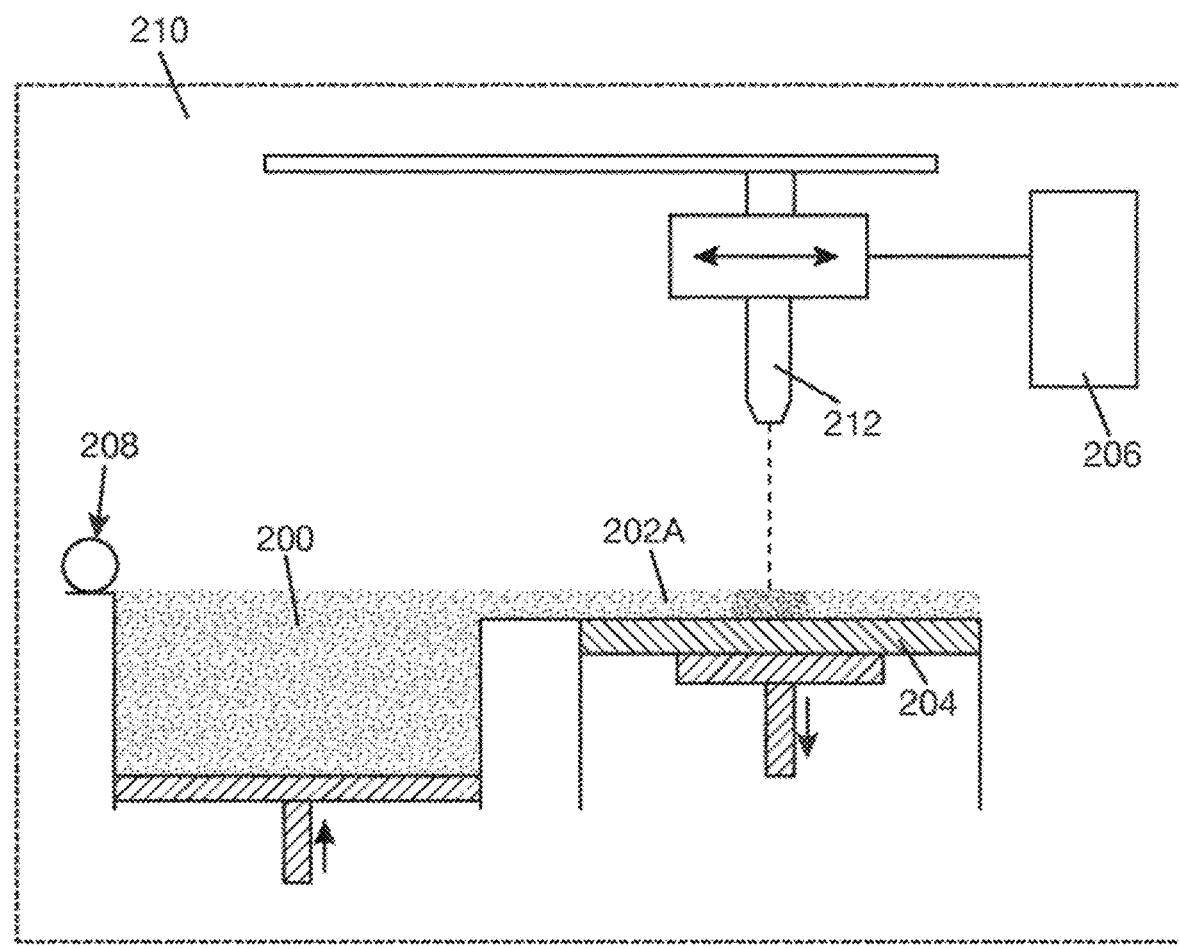
FIGS. 5A-5C illustrate a method of building a 3D structure using a printing material, according to some embodiments.
Figure 5B:
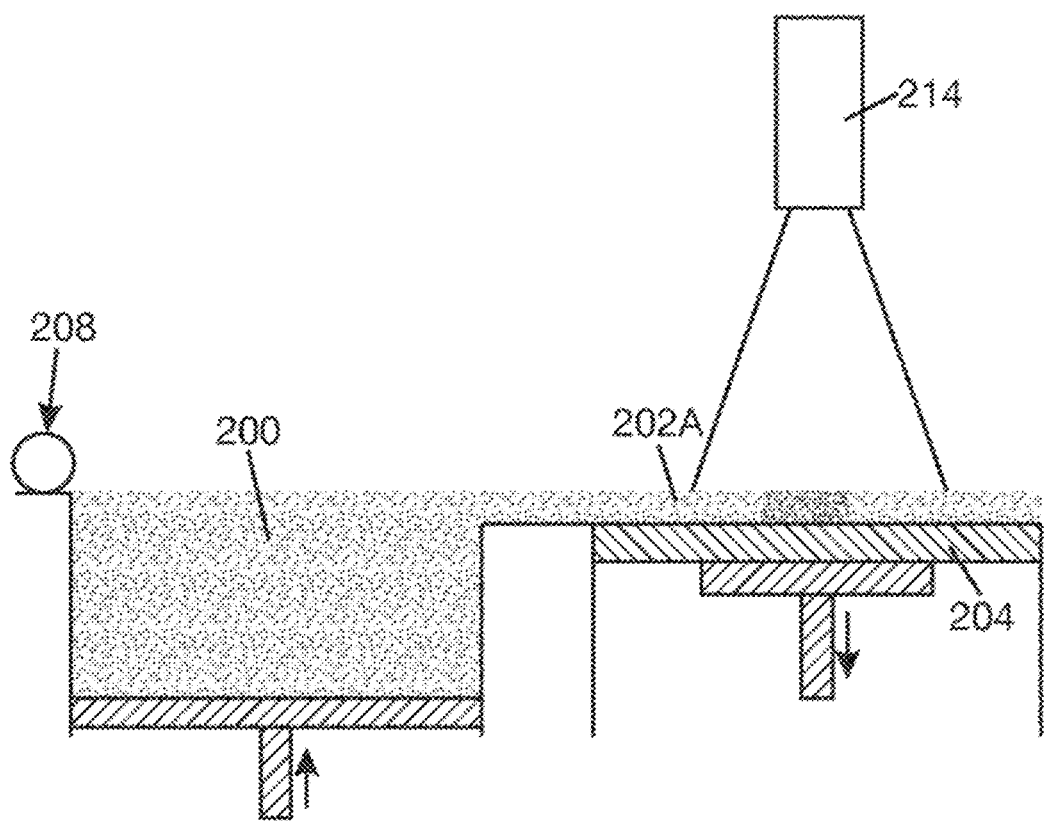
Figure 5C:
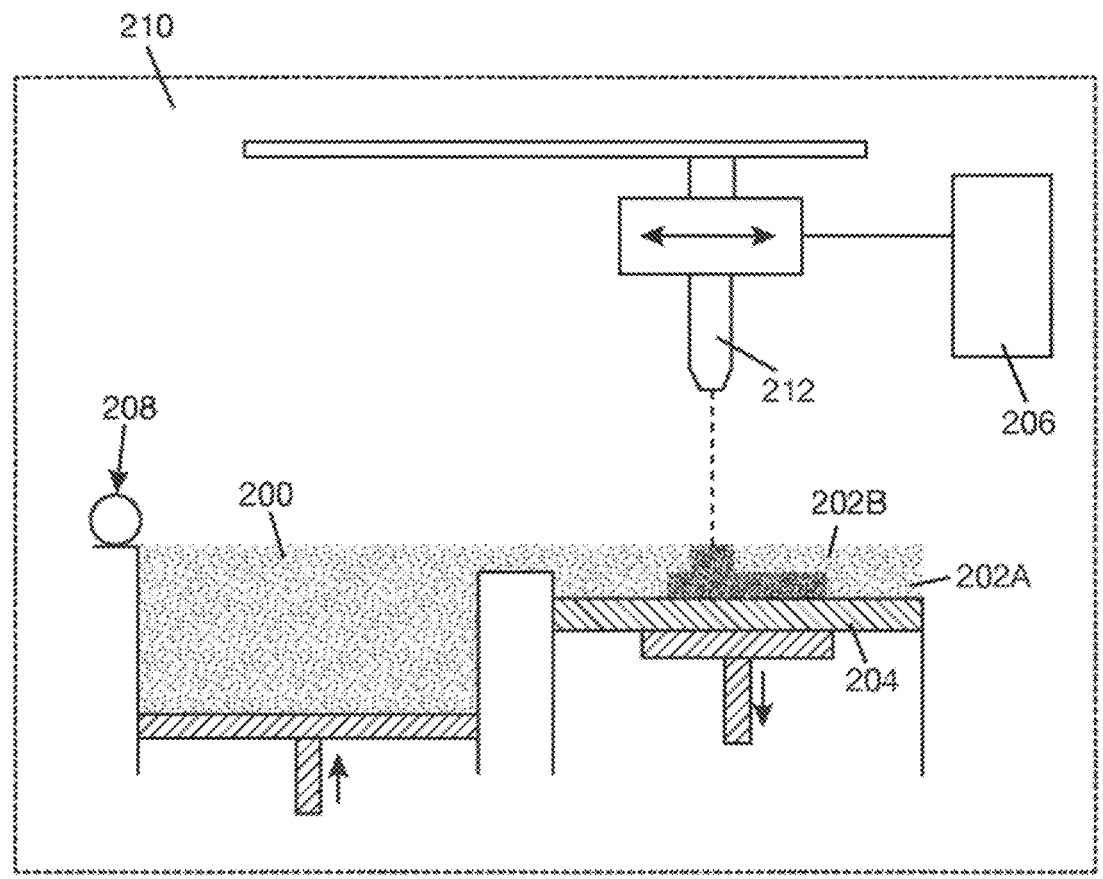

FIGS. 5A-5C illustrate a modification of the process described in FIG. 1. Instead of forming a printing material by combining a glass frit and binder composition in the form of a liquid, slurry, dispersion, paste, or suspension and applying the printing material to build platform, the glass frit is applied as a layer to the build platform and the binder composition is applied as a liquid, slurry, dispersion, paste or suspension to selected portions of the layer of glass frit. The unselected portions remain free of the binder composition. Printing occurs only at the portions of the layer of glass frit wetted by the binder composition upon exposure to a source for thermal curing or photo curing. The process is repeated layer-by-layer to build a 3D structure. When completed, the 3D structure is debinded, sintered and crystallized as described above.

As illustrated in FIG. 5A, glass frit 200 is applied to a support 204 to form a frit layer 202A of glass frit. The frit layer 202A forms a powder bed into which droplets of binder composition 206 are deposited. The glass frit 200 is preferably spread into the layer 202A under vacuum, which may optionally include vacuum degassing, to prevent incorporation of bubbles or gas pockets. This may be accomplished by enclosing the frit spreading tool 208, the glass frit 200, and the support 204 in a vacuum environment 210 during the spreading of the glass frit. To form a cross-sectional layer of the 3D structure, droplets of the binder composition 206 are delivered to select areas of the frit layer 202A by a printing head (or nozzle) 212. In one embodiment, the droplets of binder composition are delivered in a vacuum environment, which would prevent bubbles from becoming trapped in the frit layer 202A. The printing head 212 moves relative to the frit layer 202A in order to deliver the droplets to select areas of the frit layer 202A as determined by information contained in the build file of the 3D structure for this layer. The build file may be prepared as described above for the process of FIG. 1.

As shown in FIG. 5B, the frit layer 202A may be irradiated by a suitable source, such as a UV laser 214, or heated to cure the curable resin of the binder composition deposited on the frit layer 202A. Curing solidifies a cross-sectional layer of the 3D structure in the frit layer 202A. Next, as shown in FIG. 5C, a new layer of the glass frit 202B is spread on the previous layer of glass frit 202A (optionally under vacuum). Droplets of the binder composition 206 are selectively delivered to the new frit layer 202B, followed by curing the binder composition deposited in the new frit layer 202B. The process of spreading a new layer of glass frit, delivering droplets of binder composition to the new layer according to the information contained in the build file for this layer, and curing the deposited binder composition is repeated until all the cross-sectional layers of the 3D structure have been built. As described above, the process further includes debinding the 3D structure, sintering the 3D structure, and forming a glass-ceramic article by inducing crystallization in the sintered 3D structure.

Comparative Example E3

The following example illustrates a glass frit with composition listed in Table 1:

TABLE 1

| Oxide | Amount |
|---|---|
| $SiO_2$ | 51.15 wt % |
| $Al_2O_3$ | 24.79 wt % |
| $B_2O_3$ | 1.39 wt % |
| MgO | 13.1 wt % |
| ZnO | 6.51 wt % |
| BaO | 3.06 wt % |

The raw materials were mixed and introduced into a furnace that had been preheated to 1400° C. After introduction of the starting materials, the temperature of the furnace was increased from 1400° C. to 1600° C. over a period of two hours. The mixture was held at 1600° C. for 5 hours and the temperature was reduced to 1500° C. The molten mixture was then poured into water to cool and form glass. The glass was dried, ball milled for 8 hr and passed through a 50 µm sieve. The fraction passing through the sieve was collected and used as glass frit for forming a glass-ceramic article.

Figure 6:
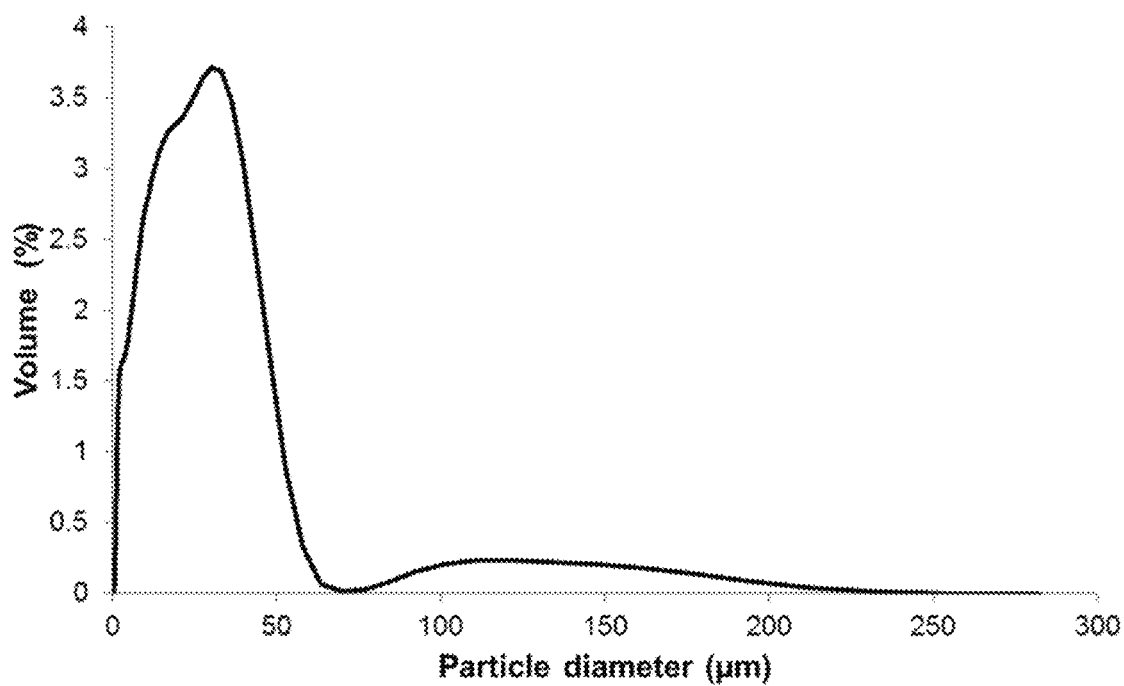
FIG. 6 depicts a particle size distribution of a glass frit, according to some embodiments.

FIG. 6 shows the particle size distribution of the glass frit (measured using a Microtrac S3500 laser diffractometer). The particle size distribution is a measure of the volume fraction of particles as a function of particle size. The glass frit has a mean particle size of 19 µm.

Figure 7:
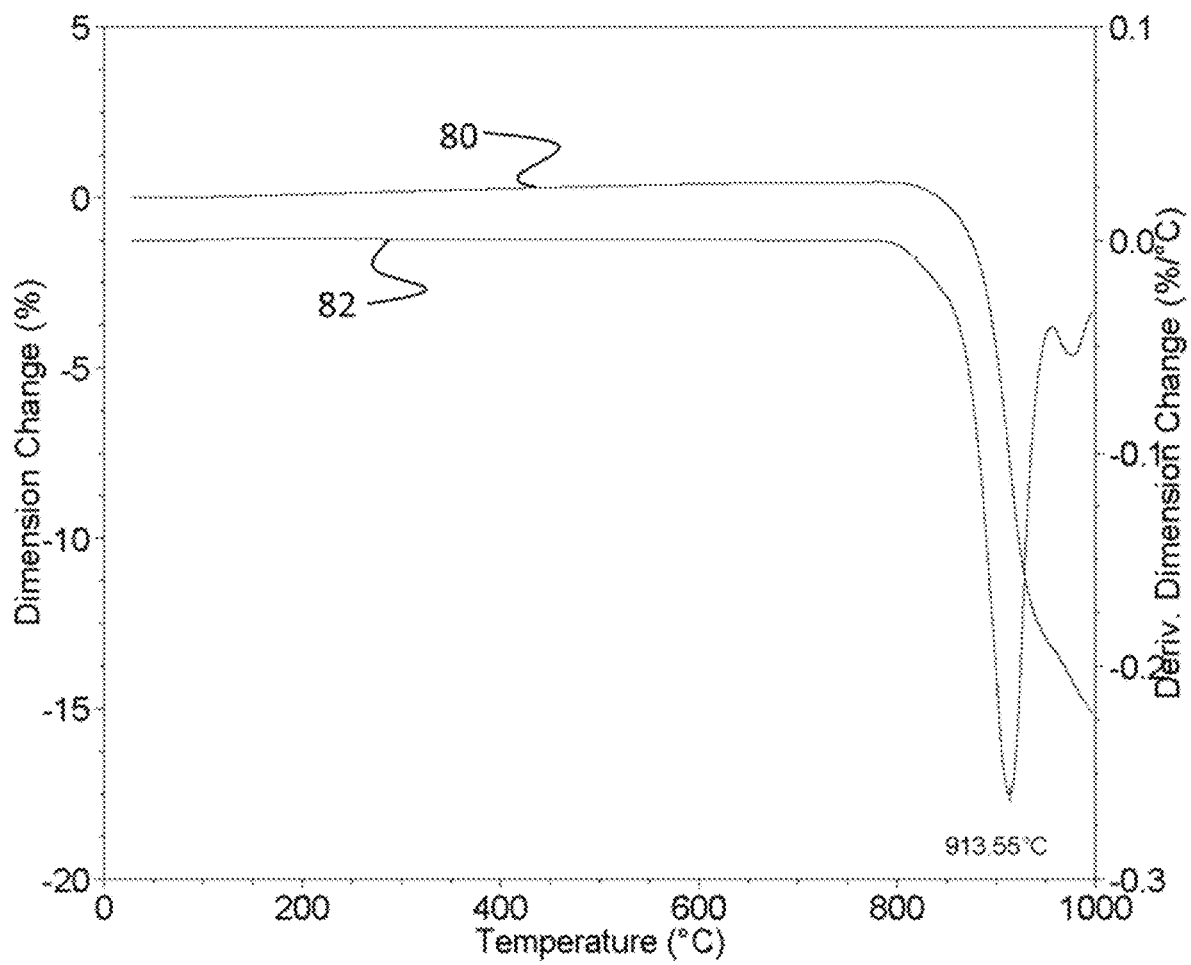
FIG. 7 shows a thermomechanical analysis (TMA) plot of a glass frit, according to some embodiments.

FIG. 7 shows a thermomechanical analysis (TMA) plot of the glass frit. The TMA results were measured using a Q400TMA thermomechanical analyzer. Samples having a diameter of 4-7 mm and a thickness of at least 10 mm were mounted in the sample compartment of the analyzer and heated in air at a rate of 10° C./min. The TMA plot includes two traces. Trace 80 shows the fractional change (expressed as a percentage) in dimension of a sample of the glass frit as a function of temperature. Trace 82 shows the derivative of Trace 80 (expressed in dimensions of %/° C.). Trace 80 shows significant shrinkage of the glass frit at temperatures between ~850° C. and ~925° C. The shrinkage is the result of sintering of the glass frit. The shrinkage is a consequence of pore closure and densification of the glass frit.

Figure 8:
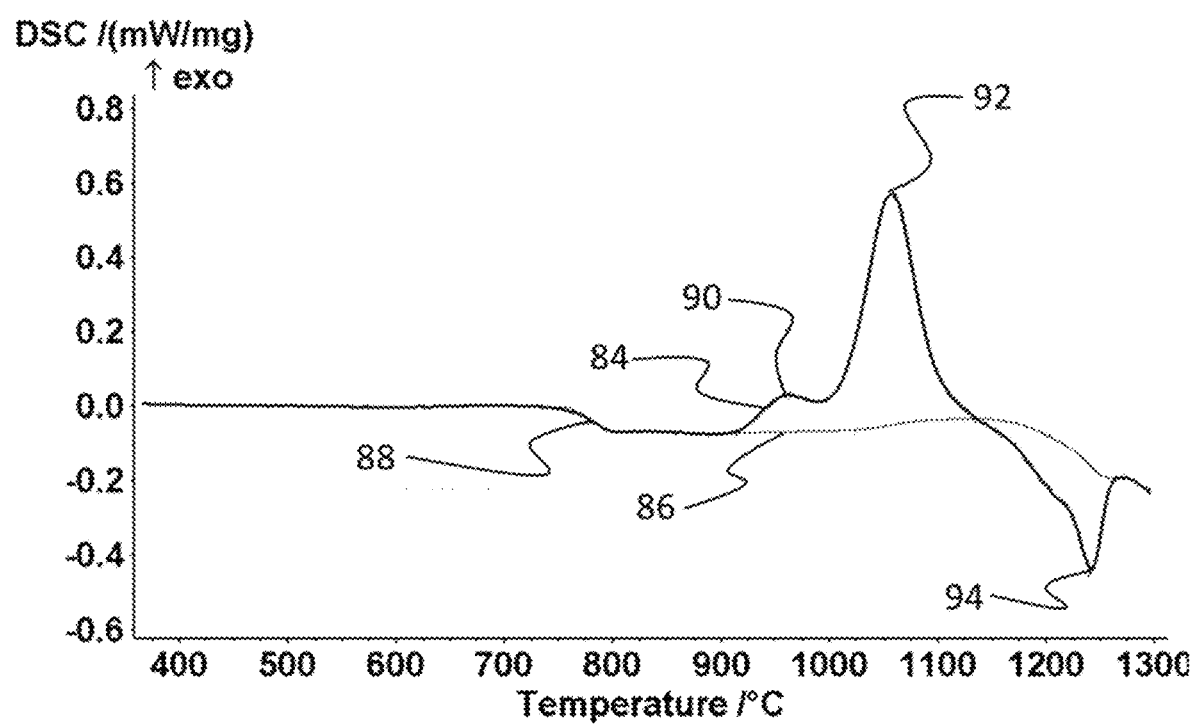
FIG. 8 shows a differential scanning calorimetry (DSC) plot of a glass frit, according to some embodiments.

FIG. 8 shows a differential scanning calorimetry (DSC) plot of the glass frit. DSC measured were performed using NETZSCH 4040 Cell DSC instrument. Samples were heated at a rate of 10° C./min. Exothermic and endothermic transitions in the glass were monitored. Trace 84 shows the DSC signal as a function of temperature and Trace 86 shows a baseline for computing areas under peaks of the DSC trace. Trace 84 shows feature 88 that marks the onset of the glass transition region (~760° C.) as well as peaks 90 (~960° C.), 92 (~1060° C.), and 94 (~1240° C.) associated with formation of crystalline phases. The DSC plot indicates that the onset of crystallization occurs at ~925° C.

Pellets of the glass frit having a diameter of ~30 mm and a thickness of a few mm were prepared and subjected to the following heat treatment schedule:

TABLE 2

| Temperature | Rate (° C./min) | Time (min) |
|---|---|---|
| RT to 350° C. | 2 | 165 |
| 350° C. to 585° C. | 0.8 | 294 |
| 585° C. to 700° C. | 5 | 23 |
| 700° C. to 950° C. | 0.8 | 313 |
| 950° C. | 0 | 240 |
| Total | | 1035 | where "RT" refers to room temperature, temperature refers to the minimum and maximum temperatures of a temperature interval, rate refers to the heating rate over the temperature interval, and time refers to the time of heating over the temperature interval.

At the conclusion of the heat treatment, the pellets were analyzed. X-ray diffraction (XRD) was used to confirm crystallization and to identify the crystalline phases present. Based on the XRD analysis, the heat treatment converted the pellets of glass frit to a glass-ceramic material. The crystalline fraction of the glass-ceramic material was estimated to be above 70 wt %. Multiple crystalline phases were detected with the following proportional distribution:

TABLE 3

| Crystalline Phase | Amount |
| --- | --- |
| Cordierite | 36.5 wt % |
| Indialite | 45.2 wt % |
| Gahnite | 2.7 wt % |
| Keatite | 1.6 wt % |
| α-Quartz | 6.2 wt % |
| Bariumosumilite | 7.7 wt % | where wt % refers to wt % of a particular crystalline phase relative to the total crystalline phase content of the glass-ceramic material. The density of the glass-ceramic material was measured to be 2.684 g/cm$^3$.

In order to determine the influence of binder in the sintering and crystallization processes, the following further experiments were conducted:

The frit was mixed with a binder (Castable resin v2 available from Formlabs) in the following proportions (vol %): glass frit (50%)+binder (29%)+IBOA (isobornyl acrylate) (21%). The mixture was poured into cylindrical molds made from the binder (dimensions: diameter 40 mm, height: a few mm). The mixtures were cured under UV in the molds to form pellets and the pellets were subjected to the following thermal cycle for debinding, sintering and crystallization:

25-100° C. (100° C./h),
100-600° C. (100° C./h),
600-800° C. (300° C./h),
800-900° C. (50° C./h),
900-950° C. (300° C./h),
Hold 2 hours at 950° C.,
Cooling at furnace rate After the thermal cycle, a linear shrinkage of 20% was observed (the diameter of the pellets was 32 mm). The density was measured with a helium pycnometer. The measured density was 2.668 g/cm$^3$. Without binder, application of the same thermal cycle to the glass frit produced a pellet with a density of 2.692 g/cm$^3$. This result shows that the binder did not significantly affect sintering and crystallization.

Example 1

In some embodiments, calcium zirconium silicate glass frits may be used to produce dense glass-ceramic objects via additive manufacturing (i.e., 3D printing). As stated above, stereolithography (SLA) may be a promising method for inorganic materials such as glasses, ceramics, or glass-ceramics.

As provided above, glass-ceramics manufacturing process are described using stereolithography. The final products are dense and present interesting properties, such as good mechanical strength, low CTE and/or good chemical durability. A glass frit precursor of a glass-ceramic is added to a binder composition comprising a resin. After 3D printing of an article is conducted by SLA, a thermal treatment is performed to successively enable debinding, sintering of the glass particles, and finally, crystallization to form a final glass-ceramic material exhibiting non-porous and very low residual porosity behavior. The resulting glass-ceramics may be potentially used in a wide range of applications such as consumer products and technical pieces.

In the present example, a new glass-ceramic is presented having wollastonite as a main crystalline phase (as compared to cordierite in other examples) with increased chemical durability (in acids and bases) and mechanical strength for use in 3d printing processes. Chemical and mechanical properties of the glass-ceramic material is dependent on glass frit composition and the thermal treatment, which, depending on the process used, result in unique crystalline phases and microstructures.

Traditional technologies often describe 3D printing using binder compositions containing resins combined with (1) ceramic and/or glass-ceramic particles or (2) mixtures of glasses and crystalline powders. After thermal treatment, these 3D printed articles are transformed into ceramic materials. These traditional techniques result in materials having high porosity, post-thermal treatment, as opposed to the desired non-porous and very low residual porosity character.

Thus, as described herein in the present example, a novel glass-ceramic having wollastonite as a main crystalline phase exhibits increased chemical durability (in acids and bases) and mechanical strength for use in 3d printing processes. In other words, glasses comprising $SiO_2$—CaO—$ZrO_2$ are used as frits in additive manufacturing processes (e.g., stereolithography) and after complete sintering and crystallization, glass-ceramics having high mechanical properties and good chemical durability (in acids and bases) may be formed.

Experimental

Glass Frit Formation

The following example illustrates a glass frit having sintering and crystallization characteristics for achieving dense glass-ceramic articles in an additive manufacturing process. Glass frits with the compositions listed in table 4 were prepared:

TABLE 4

| Composition | $SiO_2$ (wt. %) | CaO (wt. %) | $ZrO_2$ (wt. %) |
| --- | --- | --- | --- |
| E31 | 52 | 32 | 16 |
| E32 | 56 | 34 | 10 |
| E33 | 51 | 37 | 12 |

The raw materials were mixed and introduced into a furnace that had been preheated to 1400° C. After introduction of the starting materials, the temperature of the furnace was increased from 1400° C. to 1670° C. over a period of 5 hrs. The mixture was held at 1670° C. for 5 hrs. In other words, glass melting was performed for 5 hours at 1670° C. on 1 kg of raw materials in platinum crucibles in a furnace heated by SiMo electrodes. After melting, the molten mixture may be (A) poured directly in water, or (B) rolled to a low thickness, either of which allows the mixture to cool and solidify. Thereafter, the glass is optionally dried, and crushed via ball milling or vibration milling for 8 hrs. Finally, the crushed glass is passed through a 50 µm sieve such that the fraction passing through the sieve (i.e., having a particle size distribution less than 50 µm) was collected and used as glass frit for forming a glass-ceramic article. Particle size distribution is illustrated in FIG. 6. Small glass blocks were also produced and annealed for 1 hour at the glass transition temperature ($T_g$), and then cooled slowly to room temperature. Tg is indicated below in Table 5.

Glass Frit Characterization

In order to determine the sintering/crystallization schedule and to have a first estimate of the sintering ability of a glass, Differential Scanning calorimetry (DSC) and Thermo-Mechanical Analysis (TMA) were conducted. DSC was performed using a 4040 Cell DSC provided by NETZSCH. Samples (sieved powders) were analyzed under air using a heating rate of 10K/min, from room temperature to 1300° C. TMA was performed with a TMA Q400 TA INSTRUMENT system. Samples (sieved powders) were analyzed under air using a heating rate of 10K/min, from room temperature to 1000° C.

Thereafter, the sintered pellets were made and subjected to a predetermined ceramming cycle, whereby the frits were first pressed into pellets using a laboratory press at low pressure and then heat treated in a furnace with desired heat cycles. The pellets have a diameter in a range of 20 to 40 mm, and a thickness in a range of less than 10 mm. An exemplary heat cycle used comprises heating from room temperature to a hold temperature at a rate of 10° C./min, holding for approximately two hours at the hold temperature, and then cooling at a furnace rate. Several hold temperatures were tested between 900° C. and 1000° C. Shrinkage occurring during ceramming was measured to estimate the ability of the material to be fully sintered. Hold temperatures lower than 950° C. lead to high porosities. Sintering takes place during the temperature ramp to the hold temperature, while crystallization occurs at the hold temperature. After completion of the sintering/ceramming, a final glass-ceramic material is realized.

The crystallized pellets were then analyzed by X-ray powder diffraction (XRD) to determine phase assemblage and observed by Scanning Electron Microscopy (SEM) to evaluate residual porosity and the potential presence of cracks. XRD was performed using a Philips X'Pert Pro diffractometer with θ/2θ geometry. Experimental conditions include: 3 kW Copper tube configured in Kα1 (λ=1.540593), power of 45 kV/40 mA, 2θ range: 5-140°, divergence source: ¼°, step size=0.008°; scan speed=40 s, mask=20 mm, spinning: 3.75 rpm, and detector: X-Celerator. SEM analysis was conducted as follows: samples were fractured and cracked surfaces were studied using a desktop SEM Phenom Pure PW-100-015.

Measurement of modulus of rupture and chemical durability were performed on the crystallized pellets. Ring-on-Ring (ROR) tests were made on a Zwick force test machine 5 kN to estimate the biaxial flexure strength according to ASTM C1499 standard. Several samples (diameter 32 mm, thickness 2.1 mm) were broken. The reported result is the strength distribution. The value of strength at 63.2% of failure probability as well as the Weibull slope (shape parameter) are also reported. Acid and base chemical durability tests were performed following the DIN 12116 and ISO 695 standards, respectively. Two polished samples with a diameter 32 mm and a thickness or 3 mm were used for each test. For acid test (DIN 12116), the sample is immersed in 6 mol/L boiling hydrochloric acid solution for six hours and half the mass loss per surface unit is calculated, and the resistance class determined on the basis of the values obtained. For base test (ISO 695), the sample is immersed in 0.5 mol/L boiling sodium carbonate and 1 mol/L sodium hydroxide solution for three hours and the weight loss per surface unit is calculated and the resistance class determined on the basis of the values obtained.

Results

Sintering

Figure 9:
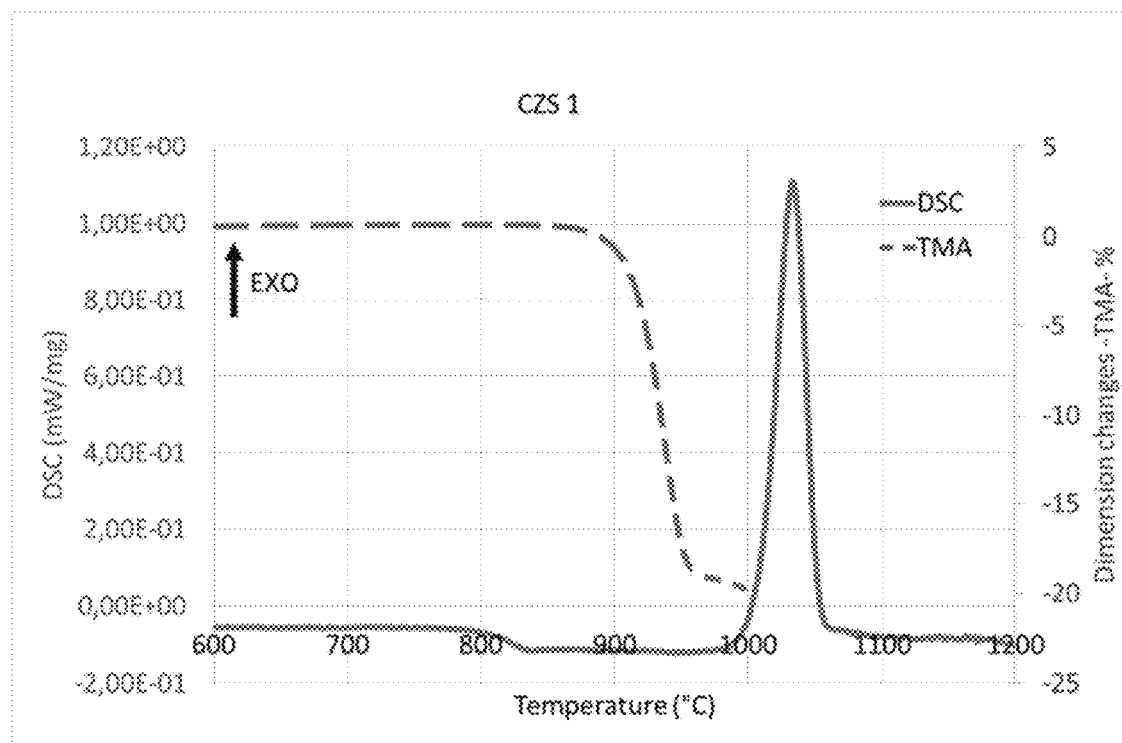
FIG. 9 shows TMA and DSC plots of E31 glass composition at a heating rate of 10° C./min, according to some embodiments.

FIG. 9 shows TMA and DSC plots of E31 glass composition at a heating rate of 10° C./min. In addition, TMA and DSC results, as well as shrinkage measured on pellets after different thermal treatments, are also indicated in Table 5 below.

TABLE 5

|  | E31 | E32 | E33 |
|---|---|---|---|
| TMA | 10° C./min from room temperature to 1300° C. | | |
| Shrinkage | 19.74% at 997° C. | 5.7% at 997° C. | 19.75% at 997° C. |
| DSC | 10° C./min from room temperature to 1300° C. | | |
| Tg | 787° C. | | 792° C. |
| Tc | 986° C. | | 985° C. |
| Tc − Tg | 199° C. | | 193° C. |
| Shrinkage measured on sintered pellets | | | |
| 2 h 950° C., heating rate = 10° C./min | 15.4% | 13% | 17.8% |

Figure 10:
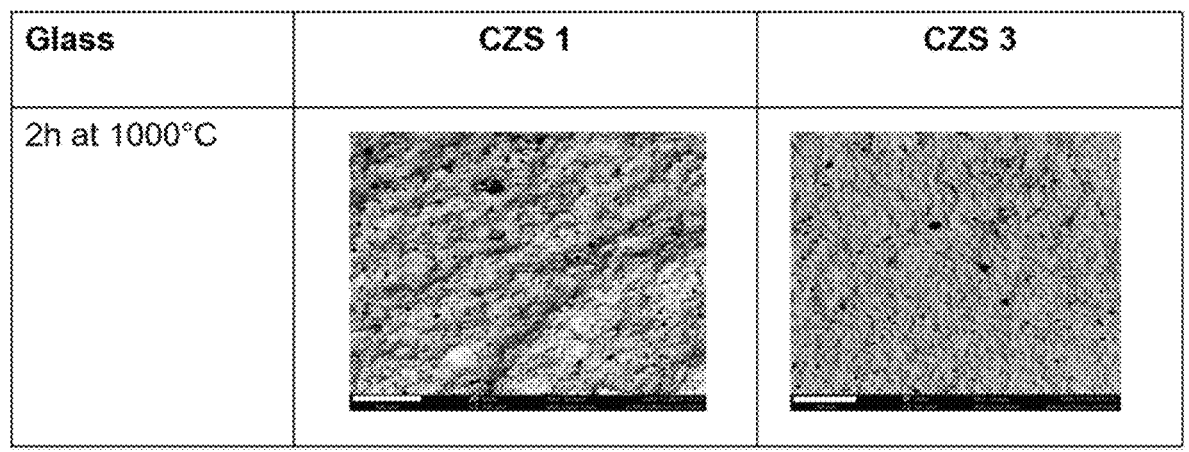
FIG. 10 shows microstructures of E31 and E33 after ceramming for 2 hrs at 950° C. and 2 hrs at 1000° C. (heating rate for both is 10° C./min; white bar corresponds to 100 μm), according to some embodiments.

The DSC and TMA experiments show a good sintering behavior for E31 and E33. In other words, after thermal treatment, shrinkage for E31 and E33 is relatively high (e.g., close to 20%) compared to shrinkage for E32 (e.g., about 5-6%), resulting in a final glass-ceramic material exhibiting non-porous and very low residual porosity behavior. Shrinkage may be dependent on multiple factors, such as glass composition or frit grain size. Moreover, the difference between the crystallization temperature (Tc) and the glass transition temperature (Tg) is greater than 190° C. Larger differences between Tc and Tg (e.g., those in a range of 120° C. to 200° C., or preferably, 140° C. to 200° C.) signify that sintering may occur before crystallization begins, as crystallization may hinder the sintering process. At least from the results of FIG. 9 and Table 5, for E31 and E33, one advantageous sintering/crystallization schedule is holding for 2 hrs at 1000° C. FIG. 10 shows microstructures of E31 and E33 after ceramming for 2 hrs at 1000° C. (heating rate for both is 10° C./min; white bar corresponds to 100 µm). SEM observations show low residual porosity (i.e., limited number of residual pores) for both ceramming conditions, as the microstructure images are homogenous. Ceramming at lower temperatures (e.g., <925° C., such as around 910° C.) lead to higher porosity. Shrinkage during sintering is very low for E32 (<6%), as measured by TMA, and may be related to elevated levels of SiO2 in the glass, as compared to E31 and E33 (see Table 4).

X-Ray Powder Diffraction (XRD)

Results of XRD analysis performed after ceramming are reported in Table 6.

TABLE 6

| | Sample | | | | |
|---|---|---|---|---|---|
| | E31 | | E32 | | E33 |
| | Ceramming | | | | |
| | 2 hrs, 950° C. | 2 hrs, 1000° C. | 2 hrs, 950° C. | 2 hrs, 950° C. | 2 hrs, 1000° C. |
| Main phases | wollastonite 2M $Ca_2Si_4ZrO_{12}$ | wollastonite 1A or 2M Tetragonal $ZrO_2$ | wollastonite 2M | wollastonite 2M | wollastonite 1A or 2M Tetragonal $ZrO_2$ |
| Minor phases | wollastonite 4A (pesudo wollastonite) | | wollastonite 4A (pseudo wollastonite) $ZrO_2$ (cubic or tetragonal) | wollastonite 4A (pseudo wollastonite) $ZrO_2$ (cubic or tetragonal) | |

After ceramming for 2 hours at 950° C., the main phase for each of E31-E33 is wollastonite. A significant amount of $Ca_2Si_4ZrO_{12}$ is formed in glasses containing higher levels of $ZrO_2$ (E31). In E32 and E33, $ZrO_2$ is only observed as a minor phase. After ceramming for 2 hours at 1000° C., both E31 and E33 display higher level of crystals than their counterparts cerammed for 2 hours at 950° C. and specifically for E31, $Ca_2Si_4ZrO_{12}$ is no longer present. In each of E31 and E33, a significant amount of $ZrO_2$ is present.

Mechanical Testing

Figure 11:
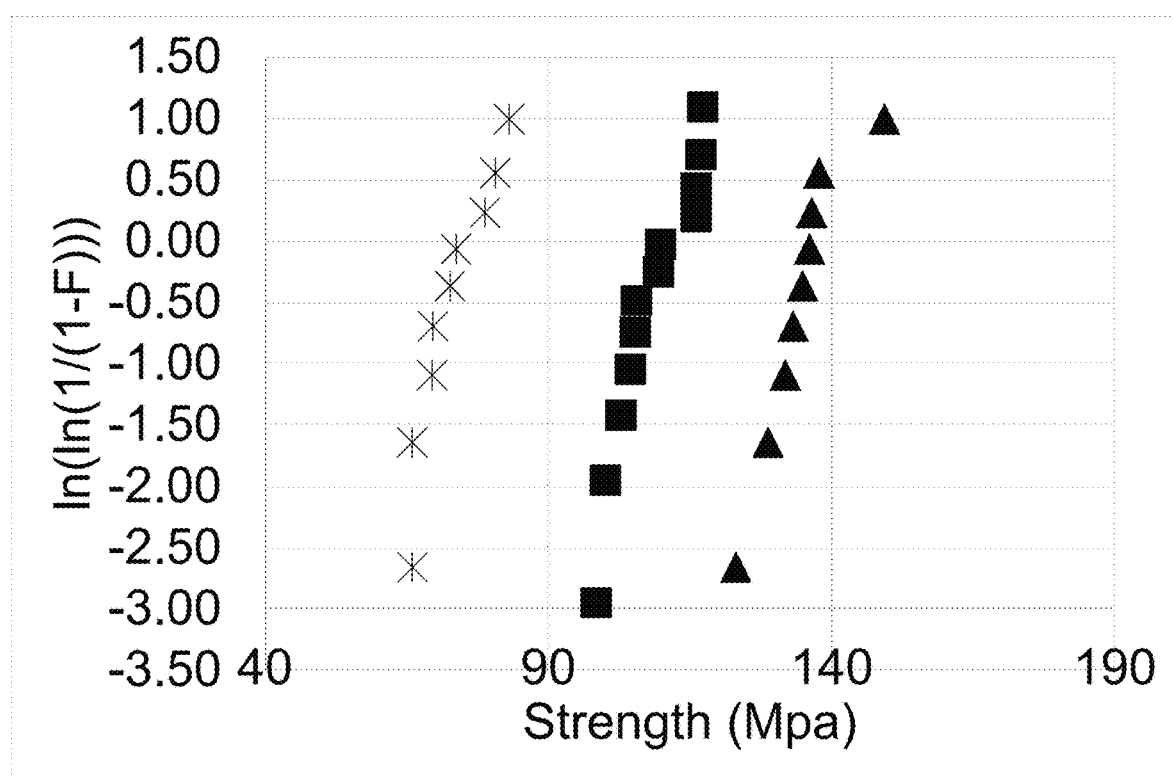
FIG. 11 shows results of the Ring-on-Ring (ROR) tests for E31, E33, and Comparative Example E3, according to some embodiments.

FIG. 11 and Table 7 show results of Ring-on-Ring (ROR) tests (e.g., strength distribution) for E31, E33, and Comparative Example E3. Both E31 and E33 exhibit a higher strength at 63.2% of failure probability (138 MPa and 111 MPa, respectively) than Comparative Example E3 (76 MPa). This may be due to good sintering of the samples and to the presence of a significant amount of $ZrO_2$ crystals. A higher Weibull modulus indicates a better mechanical strength of the material, as measured by the ROR test.

TABLE 7

| Glass-ceramic | Comparative Example E3 | E31 | E33 |
|---|---|---|---|
| Thermal treatment | — | 2 hrs at 1000° C. | 2 hrs at 1000° C. |
| Strength at 63.2% of failure probability (MPa) | 76 | 138 | 111 |
| Weibull modulus | 13 | 20 | 18 |

Chemical Durability

Table 8 shows the chemical durability results for E31, E33, and Comparative Example E3.

TABLE 8

| | | ISO 695 (base) | | DIN 12116 (acid) | |
|---|---|---|---|---|---|
| Test | Thermal treatment | Mass loss (mg/dm²) | Remark | Mass loss (mg/dm²) | Remark |
| E31 | Pellets sintered 2 hrs, 950° C. | 8.5 | Low etching | 62 | Highly soluble |
| E33 | (heating rate 10° C./min) | 18.3 | (<75 mg/dm², | 46 | (>15 mg/dm², |
| Comparative Example E3 | | 41 | class 1) | 405 | class 4) |

In both E31 and E33, the mass loss for each after exposure to acid or base is less than the mass loss exhibited by Comparative Example E3 for the same testing. In ISO 695 base, all three materials are categorized as showing low etching and in DIN 12116 acid, all three materials are categorized in class 4. However, E31 is almost 5 times more durable in basic environments as Comparative Example E3 and E33 is more than 2 times more durable. Moreover, E31 is close to 6.5 times more durable in acidic environments as Comparative Example E3 and E33 almost 9 times more durable. These durability results are likely related to higher levels of $ZrO_2$ in the E31 and E33 compositions as well as relatively high content of $SiO_2$.

Thus, as presented in Example 1, E31 and E33, glass-ceramics containing wollastonite and a zirconium rich phase ($ZrO_2$ or $Ca_2Si_4ZrO_{12}$) as crystalline phases, present superior properties when compared to those of related materials in that they present improved densification and significantly better chemical durability and mechanical resistance. These results have been demonstrated on sintered pellets with no binders. These materials are compatible with SLA processes and final parts made by this additive manufacturing process would include similar densification, mechanical strength, and chemical durability as that of the sintered pellets.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments.

Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An additive manufacturing process, comprising:
building a 3D structure from a printing material, the printing material comprising a binder composition and a glass frit comprising at least 50 wt. % $SiO_2$, at least 30 wt. % CaO, and at least 10 wt. % $ZrO_2$, the building comprising:
printing a layer of the printing material on a substrate to form a cross-section of the 3D structure;
curing selected portions of the layer of printing material to form printed regions, the cross-section further including unprinted regions comprising uncured portions of the layer of printing material; and
repeatedly printing a subsequent layers of the printing material to form a plurality of cross-sections of the 3D structure, each cross section of the plurality of cross-sections comprising printed regions and unprinted regions, each cross-section of the plurality of cross-sections being formed on a previously formed one of the plurality of cross-sections;
cleaning the 3D structure to remove uncured resin from the 3D structure;
debinding the 3D structure to form a porous 3D structure;
sintering the porous 3D structure to form a sintered 3D structure; and
forming a glass-ceramic article from the sintered 3D structure.

2. The additive manufacturing process of claim 1, wherein the binder composition comprises a curable resin.

3. The additive manufacturing process of claim 1, wherein the debinding comprises: removing the cured and remaining uncured resin from the printed and unprinted regions of the 3D structure to form pores in the remaining printed 3D structure.

4. The additive manufacturing process of claim 1, wherein the glass-ceramic article:
has a theoretical density,
comprises a glass phase and a crystalline phase,
comprises at least 1 wt. % of the crystalline phase, and wherein a density of the glass-ceramic article is at least 90% of the theoretical density.

5. The additive manufacturing process of claim 4, wherein the crystalline phase comprises a wollastonite main crystalline phase.

6. The additive manufacturing process of claim 5, wherein the glass-ceramic article further comprises a Zr-containing crystalline phase.

7. The additive manufacturing process of claim 6, wherein the Zr-containing crystalline phase comprises at least one of $ZrO_2$ or $Ca_2Si_4ZrO_{12}$.

* * * * *